United States Patent
Yazaki et al.

(10) Patent No.: US 11,988,155 B2
(45) Date of Patent: May 21, 2024

(54) COMBINED POWER SYSTEM

(71) Applicant: HONDA MOTOR CO., LTD., Tokyo (JP)

(72) Inventors: Manabu Yazaki, Wako (JP); Tatsuya Choji, Wako (JP); Naoki Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/882,643

(22) Filed: Aug. 8, 2022

(65) Prior Publication Data

US 2023/0047728 A1    Feb. 16, 2023

(30) Foreign Application Priority Data

Aug. 10, 2021   (JP) .................. 2021-130479

(51) Int. Cl.
*F02C 9/18*     (2006.01)
*F02C 6/00*     (2006.01)
*F02C 7/06*     (2006.01)

(52) U.S. Cl.
CPC .............. *F02C 9/18* (2013.01); *F02C 6/00* (2013.01); *F02C 7/06* (2013.01)

(58) Field of Classification Search
CPC ...... F02C 9/18; F02C 3/04; F02C 6/08; F02C 3/08; F02C 7/18; F04D 29/4206; F04D 29/284; F04D 29/584; F05D 2220/32; F01D 25/12

See application file for complete search history.

(56) References Cited

U.S. PATENT DOCUMENTS

| | | | | |
|---|---|---|---|---|
| 5,555,721 | A * | 9/1996 | Bourneuf .................. | F02C 7/18 415/115 |
| 5,619,850 | A * | 4/1997 | Palmer ..................... | F01D 11/04 60/785 |
| 6,325,595 | B1 * | 12/2001 | Breeze-Stringfellow .................... | F01D 17/10 415/144 |
| 6,438,941 | B1 * | 8/2002 | Elliott ....................... | F02C 9/18 60/785 |
| 6,755,025 | B2 * | 6/2004 | Eleftheriou ........... | F04D 27/023 60/795 |
| 8,087,871 | B2 * | 1/2012 | Black ..................... | F04D 29/321 415/115 |
| 8,935,926 | B2 * | 1/2015 | Wagner ............... | F04D 29/4206 60/785 |
| 9,291,099 | B2 * | 3/2016 | Sakai ................. | F04D 27/0207 |
| 9,328,734 | B2 * | 5/2016 | Colson ................ | F04D 25/024 |

(Continued)

FOREIGN PATENT DOCUMENTS

| | | |
|---|---|---|
| JP | 2002-147250 | 5/2002 |
| JP | 2002147250 A * | 5/2002 |

(Continued)

*Primary Examiner* — Craig Kim
(74) *Attorney, Agent, or Firm* — Amin, Turocy & Watson, LLP

(57) ABSTRACT

A compressor wheel is provided for the output shaft. Air bleed ports are formed in a shroud case that surrounds the compressor wheel. A plurality of air bleed passages are formed in the engine housing that surrounds the shroud case. An annular chamber is formed between the air bleed ports and the air bleed passages, for storing compressed air that is extracted from the air bleed ports.

5 Claims, 12 Drawing Sheets

(56) References Cited

U.S. PATENT DOCUMENTS

| | | | | |
|---|---|---|---|---|
| 10,107,109 B2* | 10/2018 | McCaffrey | ............... | F01D 5/187 |
| 10,359,051 B2* | 7/2019 | Gage | ..................... | F04D 29/284 |
| 10,612,416 B2* | 4/2020 | Hatfield | .................. | F01D 25/24 |
| 10,830,144 B2* | 11/2020 | Lambert | .................... | F02C 7/16 |
| 2009/0162190 A1* | 6/2009 | Romani | ................ | F04D 29/162 |
| | | | | 415/115 |
| 2010/0154433 A1* | 6/2010 | Ottaviano | ................. | F02C 7/18 |
| | | | | 60/785 |
| 2013/0098061 A1* | 4/2013 | Matwey | .................. | F01D 5/085 |
| | | | | 60/785 |
| 2016/0032931 A1* | 2/2016 | Lee | ....................... | F04D 29/584 |
| | | | | 417/368 |
| 2017/0204874 A1* | 7/2017 | Colson | ................ | F04D 29/4206 |
| 2019/0162197 A1* | 5/2019 | Hoover | ..................... | F02C 9/18 |
| 2020/0386406 A1* | 12/2020 | Redford | .................... | F02C 9/16 |
| 2021/0293253 A1* | 9/2021 | Chavez Castellanos | ..................... | |
| | | | | F04D 29/584 |

FOREIGN PATENT DOCUMENTS

| | | |
|---|---|---|
| JP | 2003-120210 | 4/2003 |
| JP | 2016-174443 | 9/2016 |

* cited by examiner

COMBINED POWER SYSTEM

CROSS-REFERENCE TO RELATED APPLICATIONS

This application is based upon and claims the benefit of priority from Japanese Patent Application No. 2021-130479 filed on Aug. 10, 2021, the contents of which are incorporated herein by reference.

BACKGROUND OF THE INVENTION

Field of the Invention

The present invention relates to a combined power system in which a rotary electric machine system and an internal combustion engine are integrally combined.

Description of the Related Art

A rotary electric machine includes a rotor having a rotating shaft, and a stator that is positioned on an outer circumference of the rotor. In JP 2002-147250 A and JP 2003-120210 A, a combined power system is disclosed in which a rotary electric machine of this type and a gas turbine engine, which is one type of internal combustion engine, are combined together. In this case, a rotating shaft of the rotary electric machine and an output shaft of the gas turbine engine are connected on the same axial line. Thus, the rotating shaft and the output shaft can rotate together integrally.

Most part of the rotary electric machine is accommodated in a rotary electric machine housing. A bearing is interposed between the rotating shaft and the rotary electric machine housing. The rotating shaft is rotatably supported in the rotary electric machine housing via this bearing. As described in JP 2016-174443 A, a lubricating oil is supplied to the bearing.

Permanent magnets are retained on the rotating shaft. Further, in JP 2016-174443 A, a cover member is disposed between the stator and the rotor to avoid a situation in which the lubricating oil adheres to the permanent magnets (see FIG. 1 of JP 2016-174443 A in particular). An O-ring is mounted to the cover member. The O-ring provides a seal between the cover member and the stator. This seal prevents the lubricating oil from entering between the cover member and the stator.

SUMMARY OF THE INVENTION

In the gas turbine engine, compressed air is generated. It is conceivable that the compressed air is guided to the rotary electric machine to form an air curtain around the bearing. In this case, since the air curtain functions as a seal, it is expected that an O-ring is dispensed with.

The pressure of the compressed air generated by the gas turbine engine may fluctuate. For example, if a compressed air whose pressure has been reduced is supplied to the rotary electric machine, there is a concern that a seal due to an air curtain may be insufficient.

An object of the present invention is to solve the above-described problems.

According to an embodiment of the present invention, there is provided a combined power system that includes a rotary electric machine system and an internal combustion engine, the rotary electric machine system including a rotary electric machine and a rotary electric machine housing configured to rotatably support a rotating shaft of the rotary electric machine, the internal combustion engine including an output shaft configured to rotate integrally with the rotating shaft. The combined power system includes a compressor wheel provided for the output shaft and configured to obtain compressed air by compressing outside air, a shroud case surrounding the compressor wheel, a turbine wheel provided for the output shaft, a diffuser configured to diffuse the compressed air that has passed between the compressor wheel and the shroud case, and an engine housing surrounding the shroud case, the diffuser, and the compressor wheel, wherein an air bleed port is formed in the shroud case in order to extract the compressed air to outside of the shroud case, a plurality of air bleed passages are formed in the engine housing, and the compressed air extracted from the air bleed port flows through the air bleed passages, and an annular chamber is formed between the air bleed port and the plurality of air bleed passages, and is configured to store the compressed air.

If compressed air is distributed into the plural air bleed passages from the air bleed port, the pressures of the distributed portions of compressed air may be different from each other. However, in the present invention, the compressed air that has passed through the air bleed port is made to flow into a single annular chamber. Accordingly, the pressure of the compressed air in the chamber becomes constant. Stated otherwise, the pressure of the compressed air is made uniform.

Further, when the compressed air that has passed through the air bleed port flows into the chamber, the compressed air diffuses in the chamber. Due to this diffusion, the pressure of the compressed air decreases.

Therefore, the occurrence of a pressure distribution in the compressed air is avoided. Further, pressure fluctuation (surging) of the compressed air is also avoided. Therefore, it is possible to maintain a substantially uniform pressure of compressed air. For example, such compressed air can be used as curtain air that surrounds the bearing in the rotary electric machine housing.

The above and other objects, features, and advantages of the present invention will become more apparent from the following description when taken in conjunction with the accompanying drawings in which a preferred embodiment of the present invention is shown by way of illustrative example.

DESCRIPTION OF THE INVENTION

It should be noted that, in the following description, the terms "left", "right", "down", and "up" designate the leftward, rightward, downward, and upward directions, respectively, particularly shown in FIGS. 3 to 5, 10 and 11. However, these directions are directions merely for the sake of convenience in order to simplify the description and facilitate understanding. That is, the directions described in the specification are not limited to the directions when the combined power system is actually placed in use.

Figure 1:
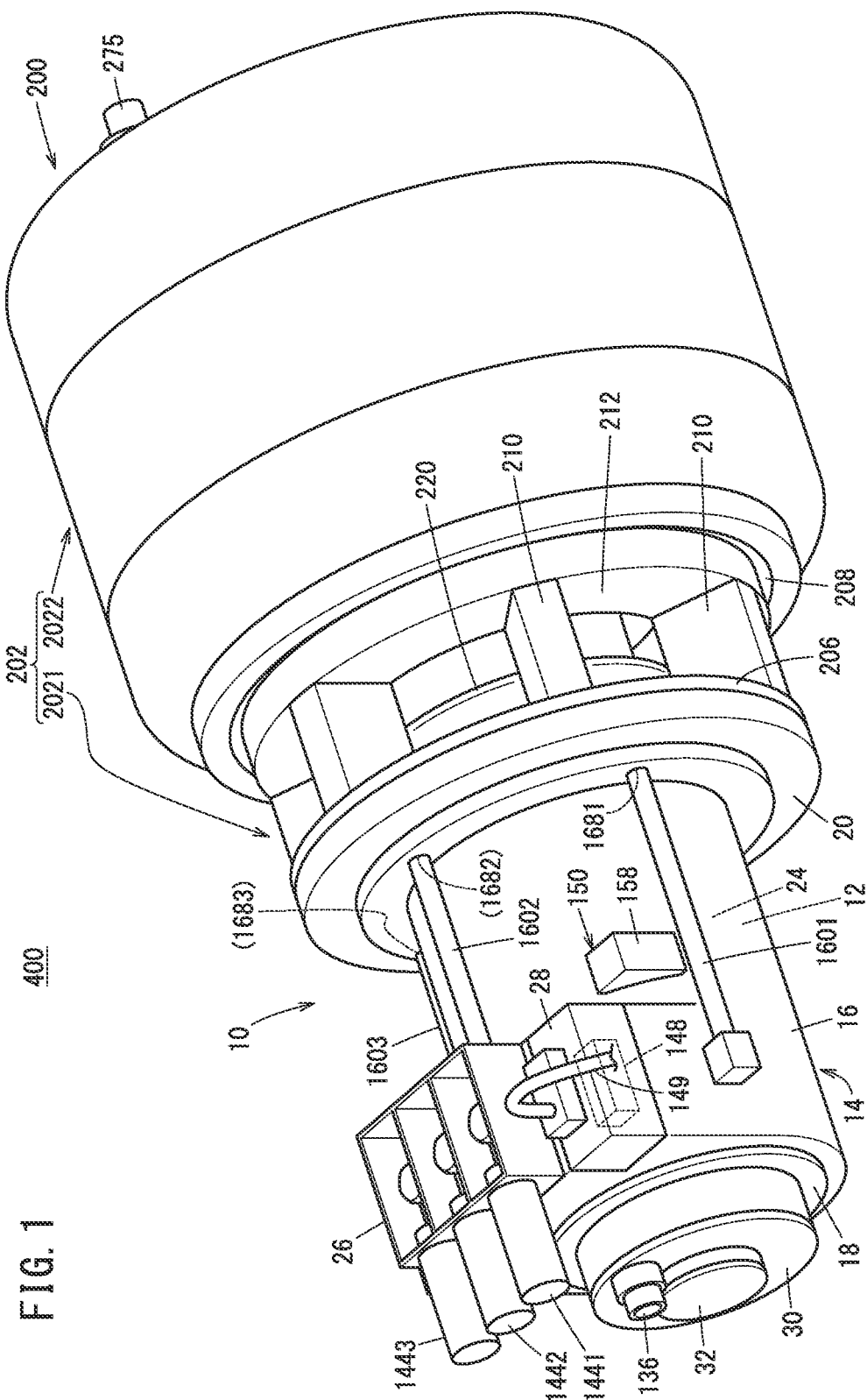
FIG. 1 is a schematic overall perspective view of a combined power system according to an embodiment of the present invention.

FIG. 1 is a schematic overall perspective view of a combined power system 400 according to the present embodiment. The combined power system 400 includes a rotary electric machine system 10 and a gas turbine engine 200. An axis that extends along a longitudinal direction (axial direction) and passes through a diametrical center of the rotary electric machine system 10, and an axis that extends along a longitudinal direction (axial direction) and passes through a diametrical center of the gas turbine engine 200 coincide with each other. Stated otherwise, the rotary electric machine system 10 and the gas turbine engine 200 are arranged in parallel on the same axis.

Hereinafter, the left end in the axial direction of each of the rotary electric machine system 10 and the gas turbine engine 200 may also be referred to as a first end. Similarly, the right end in the axial direction of each of the rotary electric machine system 10 and the gas turbine engine 200 may also be referred to as a second end. That is, in the rotary electric machine system 10, a left end portion separated from the gas turbine engine 200 is the first end. In the rotary electric machine system 10, a right end portion close to the gas turbine engine 200 is the second end. In the gas turbine engine 200, a left end portion close to the rotary electric machine system 10 is the first end. In the gas turbine engine 200, a right end portion separated from the rotary electric machine system 10 is the second end. According to this definition, in the illustrated example, the gas turbine engine 200 is disposed at the second end of the rotary electric machine system 10. The rotary electric machine system 10 is disposed at the first end of the gas turbine engine 200.

The combined power system 400 is used as a power source for propulsion in, for example, a flying object, a ship, an automobile, or the like. Preferable specific examples of the flying object include drones and multicopters. When mounted on a flying object, the combined power system 400 is used, for example, as a power drive source to rotationally energize props, ducted fans, or the like. When mounted on a ship, the combined power system 400 is used as a rotational force generating device for a screw. When mounted on an automobile, the combined power system 400 is used as a power drive source to rotationally urge a motor.

The combined power system 400 may also be utilized as a power source for an auxiliary power source in an aircraft, a ship, a building, or the like. In addition, the combined power system 400 can also be utilized as a gas turbine electrical power generating facilities.

As described below, the gas turbine engine 200 is an internal combustion engine. The gas turbine engine 200 is a gas supply device that supplies compressed air (gas).

Figure 2:
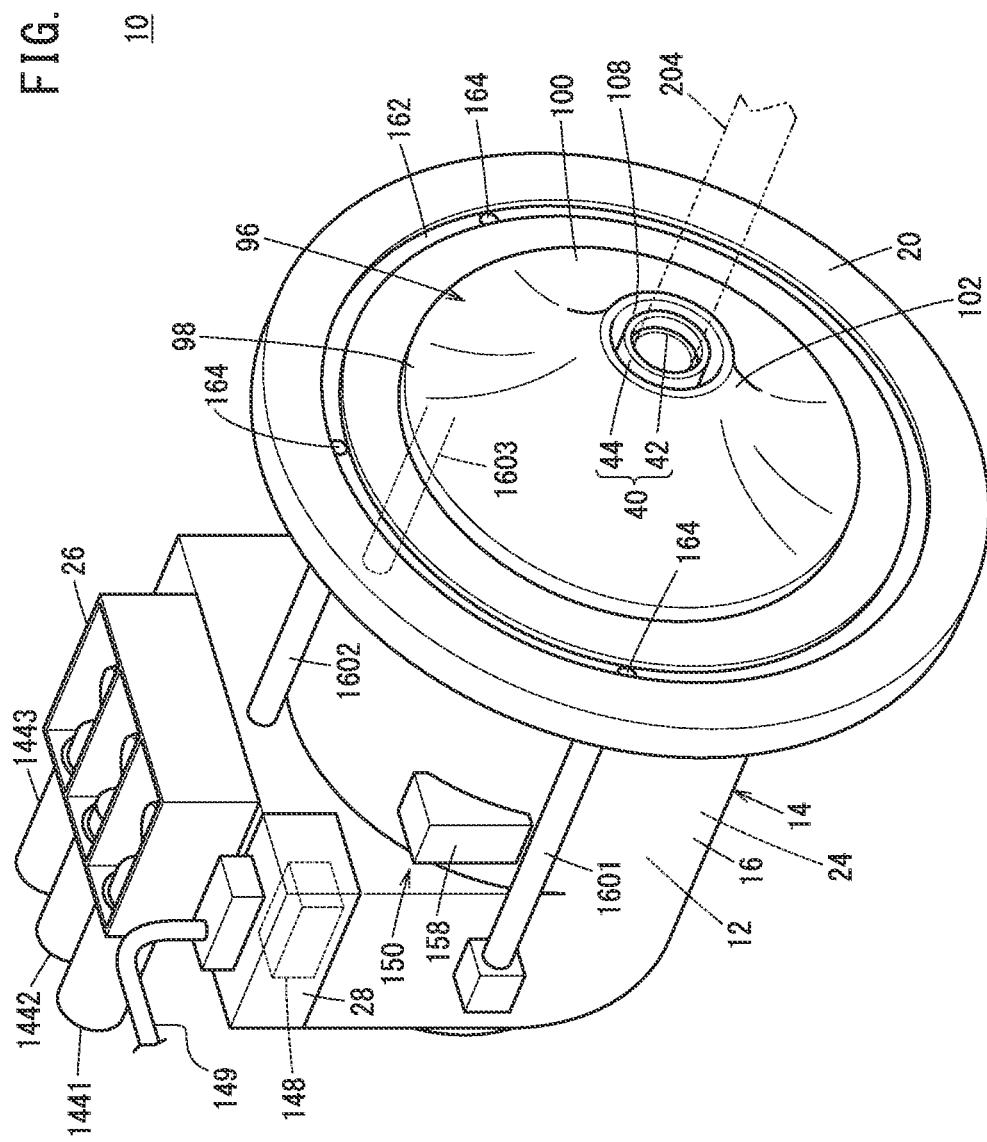
FIG. 2 is a schematic overall perspective view of the rotary electric machine system constituting part of the combined power system.
Figure 3:
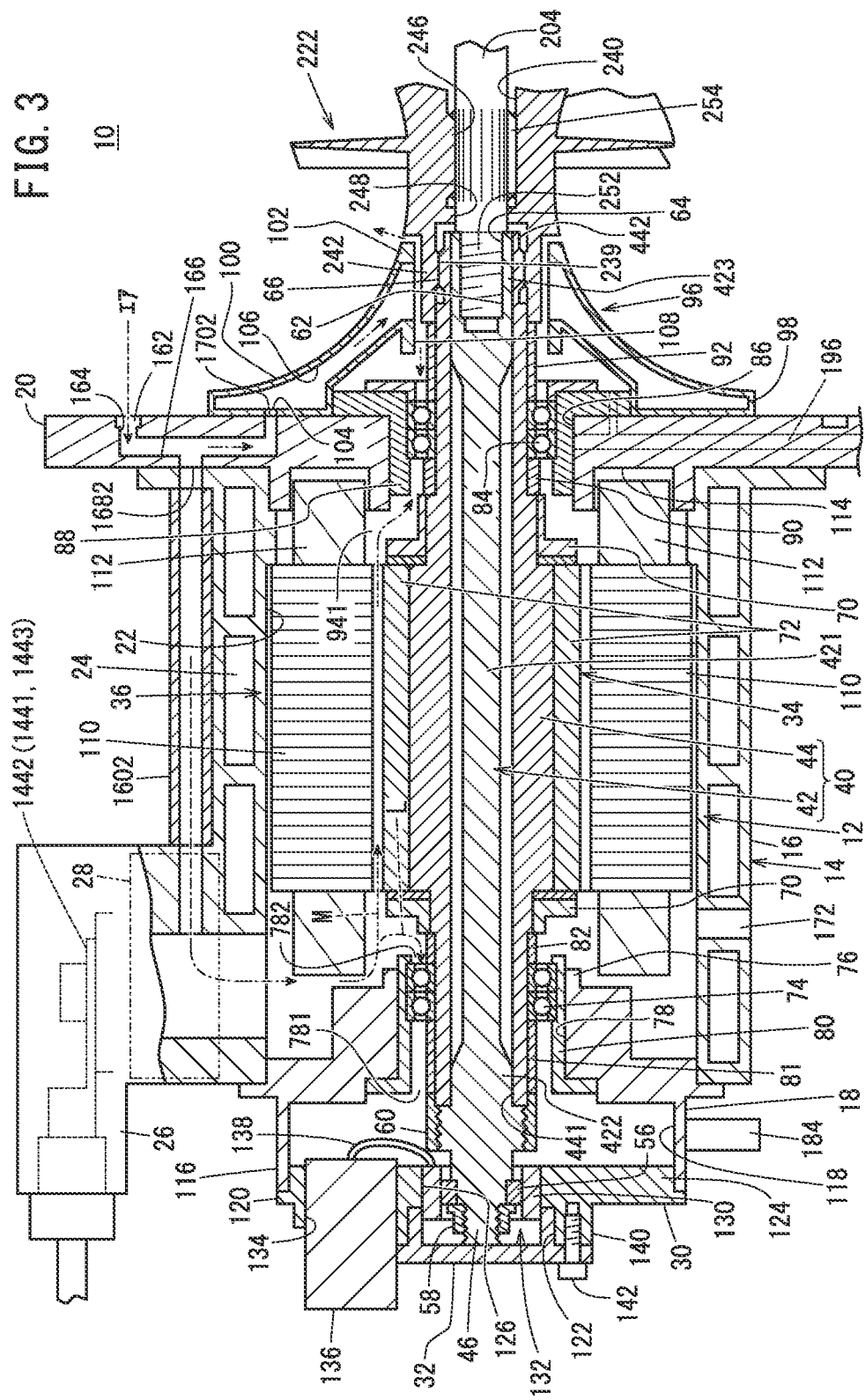
FIG. 3 is a schematic side cross-sectional view of the rotary electric machine system.

First, the rotary electric machine system 10 will be described. FIG. 2 is a schematic overall perspective view of the rotary electric machine system 10. FIG. 3 is a schematic side cross-sectional view of the rotary electric machine system 10. The rotary electric machine system 10 comprises a rotary electric machine 12 (for example, an electrical power generator) and a rotary electric machine housing 14 in which the rotary electric machine 12 is accommodated.

The rotary electric machine housing 14 includes a main housing 16, a first sub-housing 18, and a second sub-housing 20. The main housing 16 exhibits a substantially cylindrical shape, and both the first end and the second end are open ends. The first sub-housing 18 is coupled to the first end (left open end) of the main housing 16. The second sub-housing 20 is coupled to the second end (right open end) of the main housing 16. As a result, the first end and the second end of the main housing 16 are closed.

The main housing 16 has a thick side wall extending in a lateral (left-right) direction. An accommodation chamber 22 is formed in an inner portion of the side wall. Most of the rotary electric machine 12 is accommodated in the accommodation chamber 22.

A spiral cooling jacket 24 is formed inside the side wall of the main housing 16. A cooling medium flows through the cooling jacket 24. As a specific example of the cooling medium, there may be cited cooling water. In this case, the cooling jacket 24 is a water jacket.

On an outer surface (an outer side wall) of the side wall of the main housing 16, in the vicinity of an edge of the first end, a first casing 26 and a second casing 28 are disposed. The first casing 26 and the second casing 28 are portions of the main housing 16. That is, the first casing 26 and the second casing 28 are disposed integrally with the main housing 16. As will be described later, the first casing 26 is a terminal casing. The second casing 28 is a measuring device casing.

A retaining member that retains the rotation parameter detector is connected to the first sub-housing 18. According to the present embodiment, the rotation parameter detector is exemplified by a resolver 132. Therefore, hereinafter, the retaining member of the detector is referred to as a "resolver holder 30". As will be described later, a cap cover 32 is coupled to the resolver holder 30 via screws.

The rotary electric machine 12 includes a rotor 34 and a stator 36 that surrounds an outer circumference of the rotor 34.

The rotor 34 includes a rotating shaft 40. The rotating shaft 40 includes an inner shaft 42 and a hollow cylindrical outer shaft 44. Both ends of the outer shaft 44 are open ends. That is, the outer shaft 44 has a left opening end 441 (see FIG. 4) and a right opening end 442 (see FIG. 5). The inner shaft 42 is removably inserted into the outer shaft 44.

The inner shaft 42 is longer than the outer shaft 44. The inner shaft 42 includes a column portion 421, a left end part 422 (see FIG. 4), and a right end part 423 (see FIG. 5). The left end part 422 is continuous with the left side of the column portion 421. Accordingly, the left end part 422 is an end part (first end) of the inner shaft 42 that is separated from the gas turbine engine 200. The right end part 423 is continuous with the right side of the column portion 421. Accordingly, the right end part 423 is an end part (second end) of the inner shaft 42 that is close to the gas turbine engine 200. A diameter of the column portion 421 is smaller than those of the left end part 422 and the right end part 423. The diameter of the right end part 423 is smaller than that of the left end part 422.

A portion of the left end part 422 is exposed from the left opening end 441 of the outer shaft 44. A portion exposed from the left opening end 441 is a protruding distal end 46 described later. In the illustrated example, the right end part 423 of the inner shaft 42 and the right opening end 442 of the outer shaft 44 are flush with each other. However, the right end part 423 may be slightly shifted from the right opening end 442 toward the second end.

Figure 4:
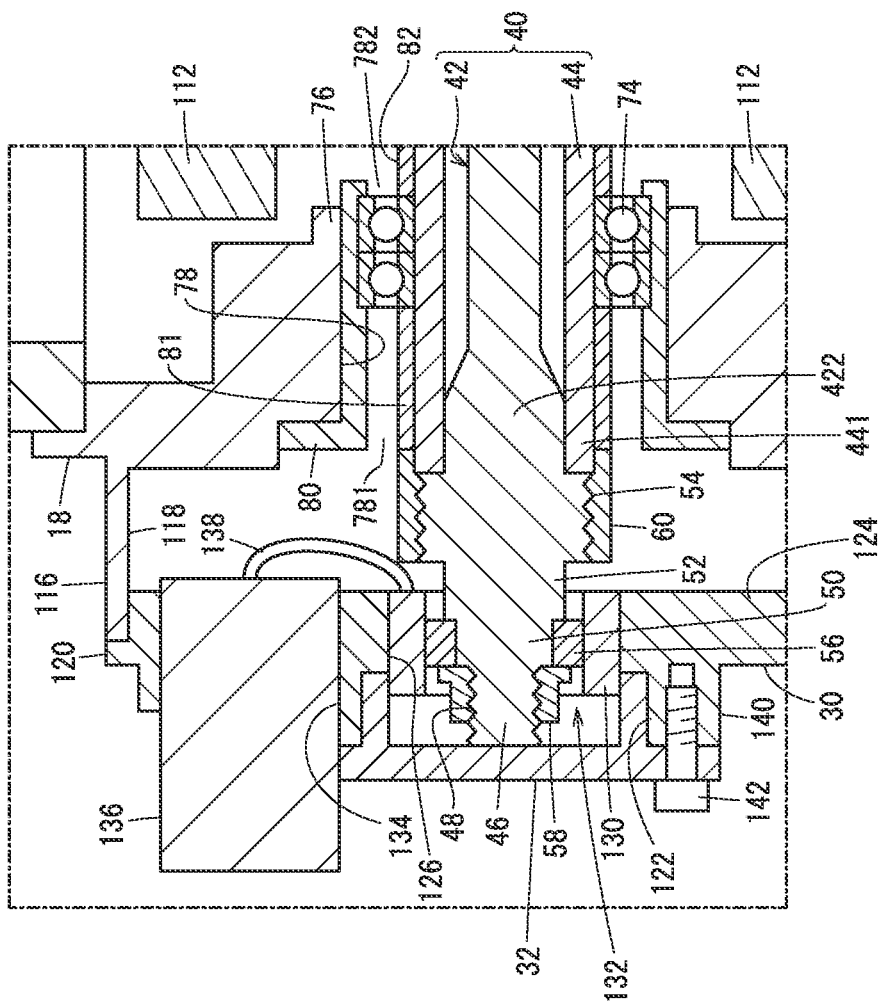
FIG. 4 is an enlarged view of principal components shown in FIG. 3.

As shown in detail in FIG. 4, the left end part 422 of the inner shaft 42 is provided with a first external threaded portion 48, a flange portion 50, a stopper portion 52, and a second external threaded portion 54 in this order toward the right. The outer diameters of the first external threaded portion 48, the flange portion 50, the stopper portion 52, and the second external threaded portion 54 become larger in this order. The outer diameter of the second external threaded portion 54 is larger than the inner diameter of the outer shaft 44. Therefore, the right end of the second external threaded portion 54 is held back by the edge of the left opening end 441 of the outer shaft 44. Consequently, part of the inner shaft 42 on a leftward side of the second external threaded portion 54 is not inserted into the outer shaft 44.

A resolver rotor 56 is attached to the flange portion 50. A small cap nut 58 is screw-engaged with the first external threaded portion 48. The right end of the resolver rotor 56 is held back by the stopper portion 52. The left end of the resolver rotor 56 is pressed by the small cap nut 58. Thus, the resolver rotor 56 is positioned and fixed to the flange portion 50.

Further, a large cap nut 60 is screwed-engaged with the second external threaded portion 54. The right end of the large cap nut 60 covers the outer circumferential wall of the left opening end 441 of the outer shaft 44. Consequently, the left end part 422 of the inner shaft 42 is constrained by the left opening end 441 of the outer shaft 44. Both the first external threaded portion 48 and the second external threaded portion 54 are so-called reverse threads. Accordingly, the small cap nut 58 and the large cap nut 60 are rotated counterclockwise at a time of being screw-engaged. After being screw-engaged, it is preferable to deform portions of the threads of the small cap nut 58 and the large cap nut 60. Thus, the small cap nut 58 and the large cap nut 60 are prevented from being loosened.

Figure 5:
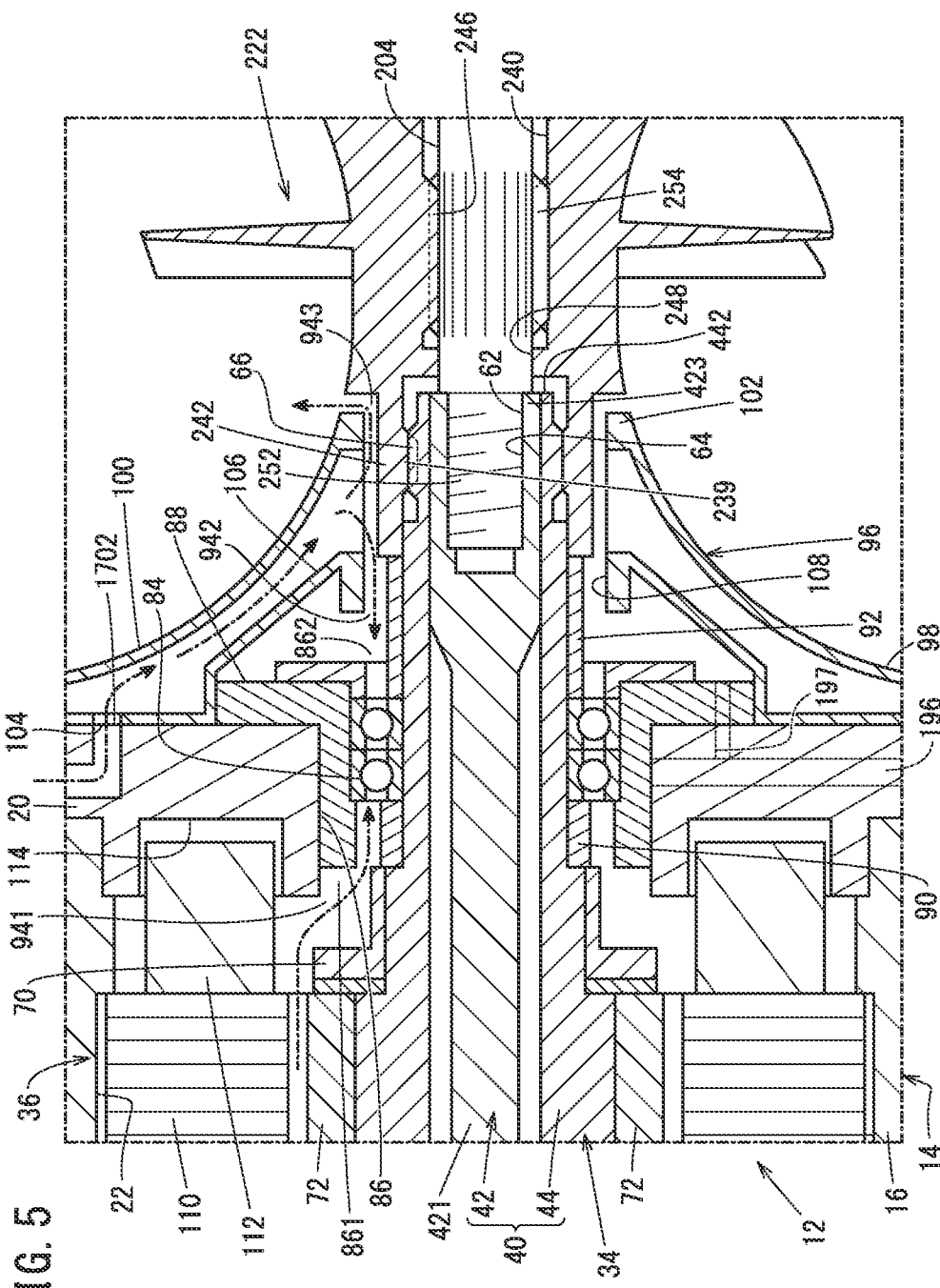
FIG. 5 is an enlarged view of principal components shown in FIG. 3, at a location that differs from that shown in FIG. 4.

As shown in FIG. 5, a connecting hole 62 is formed in the right end part 423 which is the second end of the inner shaft 42. The connecting hole 62 extends toward the left end part 422 which is the first end. A female threaded portion 64 is engraved on an inner circumferential wall of the connecting hole 62. A left end of an output shaft 204 is inserted into the connecting hole 62. The left end of the output shaft 204 is coupled to the inner shaft 42 by being screw-engaged with the female threaded portion 64. The output shaft 204 supports a compressor wheel 222 and a turbine wheel 224 (see FIG. 10).

A first inner spline 66 is formed on an outer circumferential wall of the right opening end 442 of the outer shaft 44. The first inner spline 66 extends in the axial direction (left-right direction) of the rotary electric machine system 10.

As shown in FIG. 3, an outer diameter of a substantially intermediate portion in a longitudinal direction of the outer shaft 44 is maximum. A plurality of permanent magnets 72 are retained by a magnet holder 70 on such a large-diameter intermediate portion. The adjacent permanent magnets 72 have polarities different from each other facing toward an outer side. Accompanying rotation of the rotating shaft 40, the permanent magnets 72 move on a circumference of a predetermined virtual circle about a center of rotation of the rotating shaft 40.

A left end (first end) of the rotating shaft 40 is rotatably supported in the first sub-housing 18 via a first bearing 74. As shown in FIG. 3, the first bearing 74 is inserted between the outer shaft 44 and the first sub-housing 18. Specifically, the first sub-housing 18 has a columnar protrusion 76 that protrudes toward the main housing 16. A first insertion hole 78 is formed in the columnar protrusion 76. A first bearing holder 80 holding the first bearing 74 is inserted into the first insertion hole 78. Accordingly, the first bearing 74 is disposed in the first insertion hole 78.

The first insertion hole 78 extends in the left-right direction. A left end of the first insertion hole 78 is positioned farther from the output shaft 204 than a right end of the first insertion hole 78 is. Hereinafter, the left end of the first insertion hole 78 is also referred to as a "first distal end 781". On the other hand, the right end of the first insertion hole 78 is closer to the output shaft 204 than the left end (first distal end 781) of the first insertion hole 78 is. Hereinafter, the right end of the first insertion hole 78 is also referred to as a "first proximal end 782".

A first outer stopper 81 positioned at the first distal end 781 and a first inner stopper 82 positioned at the first proximal end 782 are attached to a small diameter left end of the outer shaft 44. The first bearing 74 is sandwiched and held between the first outer stopper 81 and the first inner stopper 82. Based on being sandwiched and held therebetween, the first bearing 74 is positioned and fixed. A clearance is formed between the first outer stopper 81 and the columnar protrusion 76.

A distal end of the left end part of the rotating shaft 40 is passed through an inner hole of the first bearing 74 and then passed through the first insertion hole 78. The distal end of the left end part of the rotating shaft 40 is further exposed to the outside (hollow recessed portion 118) of the columnar protrusion 76. Hereinafter, a portion of the rotating shaft 40 that protrudes from the left end of the first bearing 74 is referred to as the "protruding distal end 46". On the protruding distal end 46, within the left end part 422 of the inner shaft 42, there are included the first external threaded portion 48, the flange portion 50, the stopper portion 52, and the second external threaded portion 54 (see FIG. 4).

A right end (second end) of the rotating shaft 40 is rotatably supported by the second sub-housing 20 via a second bearing 84. As shown in FIG. 5, the second bearing 84 is inserted between the outer shaft 44 and the second sub-housing 20 having a substantially disk shape.

The second sub-housing 20 is connected to the main housing 16 via bolts (not shown). A center of the second sub-housing 20 forms a thick-walled cylindrical portion. A second insertion hole 86 is formed in the cylindrical portion. The second insertion hole 86 extends in the left-right direction. A left end of the second insertion hole 86 is positioned farther from the output shaft 204 than a right end of the second insertion hole 86 is. Hereinafter, the left end of the second insertion hole 86 is also referred to as a "second distal end 861". On the other hand, the right end of the second insertion hole 86 is closer to the output shaft 204 than the left end (second distal end 861) of the second insertion hole 86 is. Hereinafter, the right end of the second insertion hole 86 is also referred to as a "second proximal end 862".

A second bearing holder 88 holding the second bearing 84 is inserted into the second insertion hole 86. Accordingly, the second bearing 84 is disposed in the second insertion hole 86. The second bearing 84 is sandwiched and held between a second inner stopper 90 located at the second distal end 861 and a second outer stopper 92 located at the second proximal end 862. Based on being sandwiched and held therebetween, the second bearing 84 is positioned and fixed.

Further, at the second distal end 861, a clearance is formed between the second inner stopper 90 and the second bearing holder 88. This clearance forms a third sub-branch passage 941.

As shown in FIG. 2, a rectifying member 96 is connected to an end surface of the second sub-housing 20 facing the gas turbine engine 200. The rectifying member 96 has a skirt portion 98, a reduced diameter portion 100, and a top portion 102. The skirt portion 98 facing toward the second sub-housing 20 has a large diameter and thin-walled cylindrical plate shape. The top portion 102 facing toward the gas turbine engine 200 has a small diameter and relatively long cylindrical plate shape. The reduced diameter portion 100 between the skirt portion 98 and the top portion 102 is gradually reduced in diameter. Accordingly, the rectifying member 96 is a mountain-shaped (chevron shaped) body or a bottomless cup-shaped body. The outer surface of the reduced diameter portion 100 is a smooth surface with a small amount of surface roughness.

Introduction ports 104 are formed in an end surface of the skirt portion 98 facing toward the second sub-housing 20. The reduced diameter portion 100 is hollow. That is, a relay chamber 106 is formed inside the reduced diameter portion 100. The introduction ports 104 are each an input port of compressed air to the relay chamber 106.

An insertion hole 108 is formed in the top portion 102 in the left-right direction. A diameter (opening diameter) of the insertion hole 108 is larger than an outer diameter of the second outer stopper 92 at its portion extending along the rotating shaft 40. Therefore, a portion of the second outer stopper 92 that has entered the insertion hole 108 and its outer circumferential wall are separated from an inner wall of the insertion hole 108. Stated otherwise, a clearance is formed between the outer circumferential wall of the second outer stopper 92 and the inner wall of the insertion hole 108. This clearance forms a fourth sub-branch passage 942. The relay chamber 106 becomes wider as it is closer to the insertion hole 108 and the fourth sub-branch passage 942.

Further, the diameter (opening diameter) of the insertion hole 108 is larger than the outer diameter of the left end (small diameter cylindrical portion 242) having a relatively small diameter of the compressor wheel 222. Therefore, the small diameter cylindrical portion 242 entering the insertion hole 108 is also separated from the inner wall of the insertion hole 108. Stated otherwise, a clearance is formed between an outer peripheral wall of the small diameter cylindrical portion 242 and the inner wall of the insertion hole 108. This clearance forms an outlet passage 943.

As shown in FIG. 3, the first insertion hole 78 and the third sub-branch passage 941 communicate with the accommodation chamber 22. Therefore, the first bearing 74 and the second bearing 84 are exposed to the accommodation chamber 22.

The stator 36 constitutes the rotary electric machine 12 together with the above-described rotor 34. The stator 36 includes an electromagnetic coil 110 and a plurality of insulating base members 112. The electromagnetic coil 110 includes three types, namely, a U-phase coil, a V-phase coil, and a W-phase coil, and is wound around the insulating base members 112. In the case that the rotary electric machine 12 is used as an electrical power generator, the rotary electric machine 12 is a so-called three-phase power supply. The plurality of insulating base members 112 are arranged in an annular shape. This arrangement forms an inner bore in the stator 36.

The stator 36 is accommodated in the accommodation chamber 22. In this instance, the second sub-housing 20 fulfills a role as a stator holder. That is, an annular recessed portion 114 is formed in the second sub-housing 20. The insulating base members 112 included in the stator 36 are engaged with the annular recessed portion 114. Due to such engagement, the stator 36 is positioned and fixed in place. Furthermore, the columnar protrusion 76 enters into the left opening of the inner hole of the stator 36.

The inner walls of the accommodation chamber 22 and the electromagnetic coil 110 are slightly separated away from each other. Due to such separation, the main housing 16 and the electromagnetic coil 110 are electrically isolated from each other.

A clearance is formed between the outer circumferential wall of the columnar protrusion 76 and the insulating base members 112. A clearance is also formed between the outer walls of the permanent magnets 72 and the inner wall of the electromagnetic coil 110. As will be discussed later, compressed air, which is a gas, flows through these clearances. Stated otherwise, these clearances are portions of the compressed air flow paths.

As shown in FIG. 4, the first sub-housing 18 has an annular convex portion 116 that projects out in an annular shape. An inner side of the annular convex portion 116 is formed with a hollow recessed portion 118. The protruding distal end 46, which is part of the left end part 422 of the inner shaft 42, is inserted into the hollow recessed portion 118.

The resolver holder 30 is provided on the annular convex portion 116. The resolver holder 30 includes a flange-shaped stopper 120 that protrudes outwardly in a diametrical direction. The flange-shaped stopper 120 has a greater diameter than the inner diameter of the annular convex portion 116. Therefore, the flange-shaped stopper 120 comes into abutment against the annular convex portion 116. Due to such abutment, the resolver holder 30 is positioned and fixed in place. In this state, the resolver holder 30 is connected to the first sub-housing 18, for example, via a mounting bolt or the like (not shown).

The resolver holder 30 is provided with a small cylindrical portion 122 on the left side of the flange-shaped stopper 120. A large cylindrical portion 124 is provided on the right side of the flange-shaped stopper 120. The large cylindrical portion 124 has a larger diameter than the small cylindrical portion 122. A retaining hole 126 is formed in the resolver holder 30. Most part of a resolver stator 130 is fitted into the retaining hole 126. Due to such fitting, the resolver stator 130 is retained by the resolver holder 30.

When the large cylindrical portion 124 enters into the hollow recessed portion 118 together with the flange-shaped stopper 120 abutting against the annular convex portion 116, the resolver rotor 56 is positioned in the inner hole of the resolver stator 130. The resolver stator 130 and the resolver rotor 56 constitute the resolver 132. The resolver 132 is a rotation parameter detector. In the present embodiment, the resolver 132 detects the rotation angle of the inner shaft 42.

As described above, the resolver rotor 56 is retained by the flange portion 50 of the left end part 422 of the inner shaft 42.

An engagement hole 134 is formed in the flange-shaped stopper 120. A transmission connector 136 is engaged with the engagement hole 134. The resolver stator 130 and the transmission connector 136 are electrically connected to each other via a signal line 138. A reception connector of a receiver (not shown) is inserted into the transmission connector 136. The resolver 132 and the receiver are electrically connected to each other via the transmission connector 136 and the receiving connector reception connector. The receiver receives the signal emitted by the resolver 132.

A plurality of tab portions 140 (which are omitted from illustration in FIG. 1) are provided on the small cylindrical portion 122. One of such tab portions 140 is shown in FIG. 3. Further, the small cylindrical portion 122 is covered with the cap cover 32. The cap cover 32 closes the leftward opening of the small cylindrical portion 122 and shields the left end part 422 of the inner shaft 42. The cap cover 32 is coupled to the tab portions 140 via coupling bolts 142.

As noted previously, the first casing 26 and the second casing 28 are integrally provided on a side wall in close proximity to the left end of the main housing 16. A U-phase terminal 1441, a V-phase terminal 1442, and a W-phase terminal 1443 are accommodated in the first casing 26. The U-phase terminal 1441 is electrically connected to the U-phase coil of the electromagnetic coil 110. The V-phase terminal 1442 is electrically connected to the V-phase coil of the electromagnetic coil 110. The W-phase terminal 1443 is electrically connected to the W-phase coil of the electromagnetic coil 110. The U-phase terminal 1441, the V-phase terminal 1442, and the W-phase terminal 1443 are electric terminal portions to which an external device (an external load or an external power supply) is electrically connected. The electric power generated by the rotary electric machine 12 is supplied to the external device. As examples of the external load, there may be cited a motor (not shown). As examples of the external device, there may be cited a battery 146 shown in FIG. 6.

The second casing 28 is adjacent to the first casing 26. A thermistor 148, which is a temperature measuring device, is accommodated in the second casing 28. Although not illustrated in particular, measurement terminals of the thermistor 148 are drawn out from the second casing 28 and are connected to the electromagnetic coil 110. From the second casing 28, a harness 149 which is connected to the thermistor 148 is drawn out to the exterior.

An internal space of the second casing 28 and an internal space of the first casing 26 communicate with each other through a non-illustrated mutual communication hole. The internal space of the first casing 26 communicates with the accommodation chamber 22.

Figure 6:
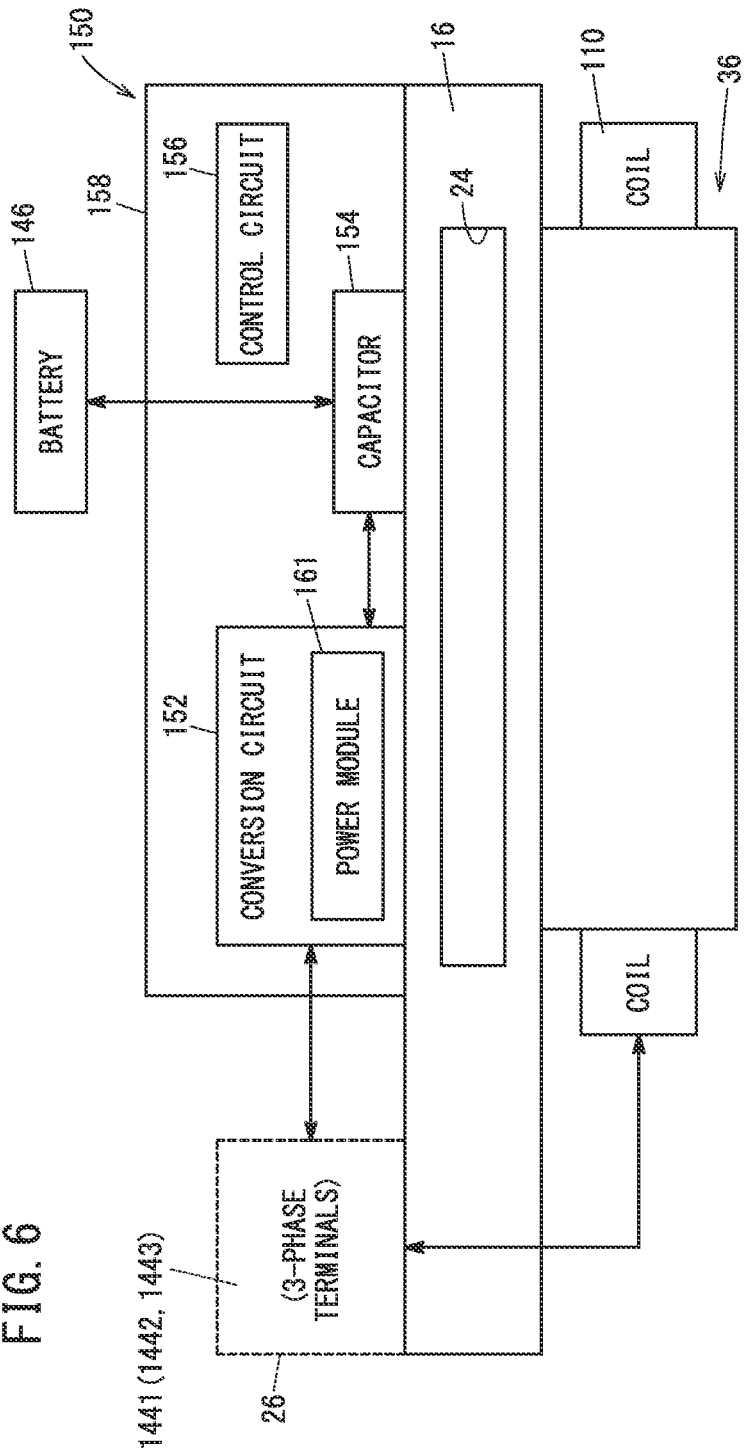
FIG. 6 is a schematic configuration diagram of an electrical current converter provided in the rotary electric machine housing.

As shown in FIGS. 1 and 2, an electrical current converter 150 is provided on an outer circumferential wall of the main housing 16. The electrical current converter 150 is closer to the gas turbine engine 200 than the first casing 26 is. As shown in FIG. 6, the electrical current converter 150 includes a conversion circuit 152, a capacitor 154, and a control circuit 156. The conversion circuit 152, the capacitor 154, and the control circuit 156 are accommodated inside an equipment case 158. The equipment case 158, for example, is disposed on the outer circumferential wall of the main housing 16 that does not interfere with a first hollow pipe member 1601, a second hollow pipe member 1602, and a third hollow pipe member 1603 (see FIG. 1).

Hollow interior parts of the first hollow pipe member 1601, the second hollow pipe member 1602, and the third hollow pipe member 1603 are relay communication passages through which compressed air flows. That is, in the present embodiment, three relay communication passages are formed for the rotary electric machine housing 14.

The conversion circuit 152 includes a power module 161. The conversion circuit 152 converts an alternating current generated in the electromagnetic coil 110 into a direct current. At this time, the capacitor 154 temporarily stores as an electric charge the direct current converted by the conversion circuit 152. The conversion circuit 152 also has a function of converting the direct current delivered thereto from the battery 146 into an alternating current. In this case, the capacitor 154 temporarily stores as an electric charge the direct current delivered from the battery 146 toward the electromagnetic coil 110.

The control circuit 156 controls a current density or the like of the direct current from the capacitor 154 to the battery 146, or the direct current from the battery 146 to the capacitor 154. The direct current from the battery 146 is supplied to the motor, for example, via an AC-DC converter (neither of which is shown).

The rotary electric machine system 10 configured as described above is provided with a compressed air flow path (first supply path) and a lubricating oil flow path (second supply path). First, the compressed air flow path will be described.

Figure 7:
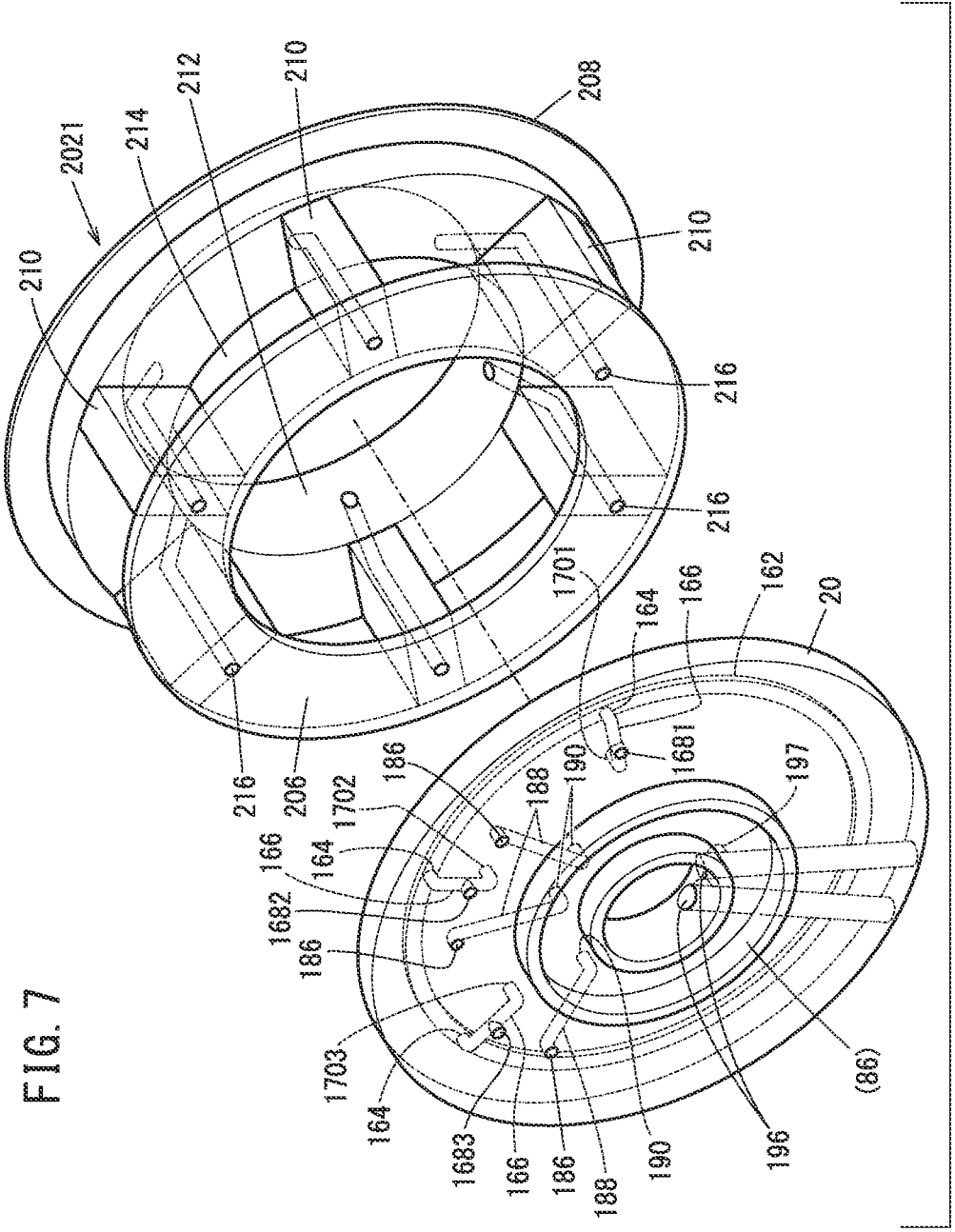
FIG. 7 is a schematic perspective view of a second sub-housing constituting the rotary electric machine housing and an inner housing in an engine housing.

As shown in FIG. 7, an annular collection flow path 162 as an annular recessed portion is formed in an end surface of the second sub-housing 20 in facing relation to the gas turbine engine 200. As will be described later, a portion of the compressed air generated by the gas turbine engine 200 flows through the collection flow path 162. Upstream communication holes 164 are formed at three locations in the bottom wall of the collection flow path 162 (annular recessed portion). The upstream communication holes 164 are each an input port of compressed air.

Air relay passages 166 are provided inside the second sub-housing 20. The air relay passages 166 extend in a radial form along a diametrical direction of the second sub-housing 20. Each of the air relay passages 166 communicates with the collection flow path 162 via the upstream communication hole 164 on the outer side in the diametrical direction. Furthermore, three first downstream communication holes 1681 to 1683 are formed on an end surface of the second sub-housing 20 in facing relation to the rotary electric machine 12. The first downstream communication holes 1681 to 1683 are first output ports of the air relay passages 166. A distribution passage is formed by the collection flow path 162 and the air relay passages 166.

Three second downstream communication holes 1701 to 1703 are formed in an end surface of the second sub-housing 20 facing toward the gas turbine engine 200. The second downstream communication holes 1701 to 1703 are second output ports of the air relay passages 166. The second downstream communication holes 1701 to 1703 are positioned inwardly in the diametrical direction of the first downstream communication holes 1681 to 1683. Therefore, the compressed air flowing through the air relay passages 166 is divided into compressed air entering into the first downstream communication holes 1681 to 1683 and compressed air entering into the second downstream communication holes 1701 to 1703.

As shown in FIG. 2, the first hollow pipe member 1601 to the third hollow pipe member 1603 are provided in the outer surface of the side wall of the main housing 16. The first downstream communication holes 1681 to 1683 individually open into the first hollow pipe member 1601 to the third hollow pipe member 1603, respectively. As can be understood from such a configuration, the air relay passages 166 place the collection flow path 162 in communication with the hollow interior parts of the first hollow pipe member 1601 to the third hollow pipe member 1603. As shown in FIG. 3, the first hollow pipe member 1601 to the third hollow pipe member 1603 are positioned externally in the diametrical direction of the cooling jacket 24 that is formed in an interior part of the side wall of the main housing 16.

The first hollow pipe member 1601 to the third hollow pipe member 1603 extend in the axial direction of the main housing 16. The hollow interior part of the first hollow pipe member 1601 communicates with the internal space of the second casing 28. The hollow interior parts of the second hollow pipe member 1602 and the third hollow pipe member 1603 communicate with the internal space of the first casing 26. As will be described later, curtain air flowing through the hollow interior part of the first hollow pipe member 1601 flows into the internal space of the second casing 28. Curtain air flowing through the hollow interior parts of the second hollow pipe member 1602 and the third hollow pipe member 1603 flows into the internal space of the first casing 26. As can be understood from such a configuration, the first casing 26 and the second casing 28 are disposed downstream of the portions of the first hollow pipe member 1601 to the third hollow pipe member 1603 that are positioned outside the cooling jacket 24.

As described above, the internal space of the first casing 26 and the internal space of the second casing 28 communicate with each other via the mutual communication hole. The internal space of the first casing 26 communicates with the accommodation chamber 22. Therefore, the compressed air flowing through the first hollow pipe member 1601 to the third hollow pipe member 1603 flows into the accommodation chamber 22 via the first casing 26.

According to the present embodiment, although a case is illustrated in which the first hollow pipe member 1601 to the third hollow pipe member 1603 are provided, the number of the hollow pipe members is determined appropriately, depending on a required flow rate and a required flow velocity of the curtain air that is formed from compressed air. More specifically, the number of the hollow pipe members is not limited to three. Further, in a similar manner, the cross-sectional area of the hollow pipe members may be determined appropriately, depending on the required flow rate and the required flow velocity of the curtain air.

The compressed air flowing into the accommodation chamber 22 is then divided into compressed air flowing toward the first insertion hole 78 and compressed air flowing toward the second insertion hole 86. More specifically, a portion of the compressed air flows through a clearance between the first sub-housing 18 and the rotor 34 toward the first insertion hole 78. In this manner, the clearance between the first sub-housing 18 and the rotor 34 forms the first branch passage L. On the other hand, a part of the remaining portion of the compressed air mainly flows through the clearance between the outer walls of the permanent magnets 72 and the inner wall of the electromagnetic coil 110 and flows toward the second insertion hole 86. In this way, the clearance between the outer walls of the permanent magnets 72 and the inner wall of the electromagnetic coil 110 forms the second branch passage M.

The compressed air that has reached the first branch passage L forms an air curtain that seals the lubricating oil supplied to the first bearing 74. The compressed air that has reached the third sub-branch passage 941 (the second distal end 861 of the second insertion hole 86) from the second branch passage M forms an air curtain that seals the lubricating oil supplied to the second bearing 84. In this way, the compressed air flowing into the accommodation chamber 22 functions as an air curtain.

As shown in FIG. 5, the three introduction ports 104 are formed in the skirt portion 98 of the rectifying member 96. One of such introduction ports 104 is shown in FIG. 5. One of the introduction ports 104 is connected to the second downstream communication hole 1701 (not shown). Another introduction port 104 is connected to the second downstream communication hole 1702 (illustrated). The other introduction port 104 is connected to the second downstream communication hole 1703 (not shown). Accordingly, the compressed air output from the second downstream communication holes 1701 to 1703 enters into the relay chamber 106 of the reduced diameter portion 100 of the rectifying member 96 via the introduction ports 104.

The relay chamber 106 is connected to the insertion hole 108 formed in the top portion 102. The relay chamber 106 becomes wider as it is closer to the insertion hole 108 and the fourth sub-branch passage 942. Therefore, as the compressed air flows through the relay chamber 106, the pressure of the curtain air decreases.

An outlet of the relay chamber 106 faces the small diameter cylindrical portion 242 of the compressor wheel 222. Therefore, the compressed air having entered into the relay chamber 106 comes into contact with the small diameter cylindrical portion 242 of the compressor wheel 222. The compressed air is then divided into compressed air directed to the fourth sub-branch passage 942 and compressed air directed to the outlet passage 943. As a result, the pressure of the compressed air flowing toward the second proximal end 862 of the second insertion hole 86 along the fourth sub-branch passage 942 decreases.

The compressed air that has reached the second proximal end 862 of the second insertion hole 86 from the fourth sub-branch passage 942 forms an air curtain that seals the lubricating oil supplied to the second bearing 84. Further, the compressed air flowing into the outlet passage 943 is guided to the inside of the first end (open end) of a shroud case 220. This compressed air is drawn into the compressor wheel 222 again.

A discharge passage 172 (first discharge passage) is formed in the main housing 16. The compressed air that has reached the first branch passage L and the compressed air that has reached the second branch passage M are discharged to the outside of the main housing 16 via the discharge passage 172.

Figure 8:
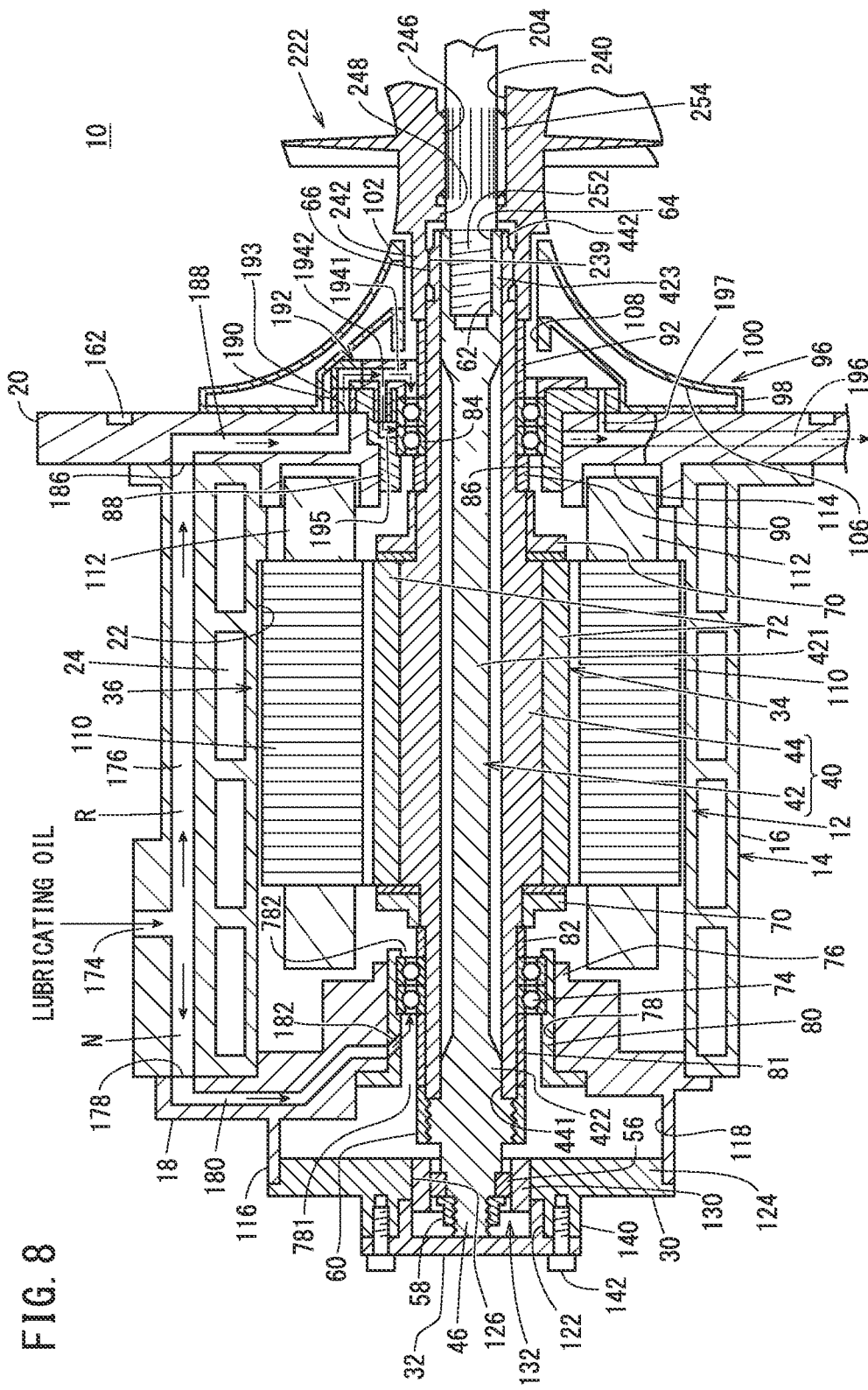
FIG. 8 is a schematic side cross-sectional view of the rotary electric machine system in a phase that differs from the phase in FIG. 3.

Next, the lubricating oil flow passage (second supply passage) will be described. FIG. 8 is a schematic side cross-sectional view of the rotary electric machine system 10. FIG. 8 shows a phase different from the phase shown in FIG. 3.

An input passage 174 for supplying a lubricating oil is formed in a side wall of the main housing 16. The input passage 174 is formed at a position on the first end side compared with the middle of the main housing 16 in the axial direction. The input passage 174 extends in the diametrical direction of the main housing 16 and communicates with a main oil passage 176. The main oil passage 176 is formed on the outer circumference of the cooling jacket 24 and extends in the axial direction of the main housing 16. The main oil passage 176 is branched into a third branch passage N extending toward the first sub-housing 18 and a fourth branch passage R extending toward the second sub-housing 20, with a communicating portion with the input passage 174 as a boundary.

A first inflow hole 178 is formed in a portion of the first sub-housing 18 facing toward the third branch passage N. Further, a first auxiliary oil passage 180 is formed inside the first sub-housing 18 so as to extend inwardly in the diametrical direction of the first sub-housing 18. The first auxiliary oil passage 180 is bent at two positions before reaching the first bearing holder 80.

A first oil supply hole 182 communicating with the first auxiliary oil passage 180 is formed in the first bearing holder 80. An outlet of the first oil supply hole 182 is formed at the first distal end 781 of the first insertion hole 78. Therefore, the lubricating oil flowing from the main oil passage 176 into the first auxiliary oil passage 180 flows from the first oil supply hole 182 to the first distal end 781 of the first insertion hole 78, and comes into contact with the first bearing 74.

As shown in FIG. 3, a first drain passage 184 (one of the second discharge passages) is formed in the first sub-housing 18. The first drain passage 184 discharges the lubricating oil from the hollow recessed portion 118 formed by the annular convex portion 116 of the first sub-housing 18 and the resolver holder 30.

Three third branch passages N, three first inflow holes 178, three first auxiliary oil passages 180, and three first oil supply holes 182 are formed. Similarly, three fourth branch passages R are formed. FIG. 8 shows one of the third branch passages N, one of the first inflow holes 178, one of the first auxiliary oil passages 180, one of the first oil supply holes 182, and one of the fourth branch passages R.

As shown in FIG. 7, three oil receiving holes 186 are opened in an end surface of the second sub-housing 20 facing toward the rotary electric machine system 10. The oil receiving holes 186 are each located outwardly in the diametrical direction, compared with the first downstream communication holes 1681 to 1683. The oil receiving holes 186 are input ports of lubricating oil.

Inside the second sub-housing 20, three second auxiliary oil passages 188 are provided as oil supply passages. The second auxiliary oil passages 188 each extend in a radial form along the diametrical direction of the second sub-housing 20. It should be noted that the second auxiliary oil passages 188 are formed in certain phases (at angular positions) that are different from the phases of the air relay passages 166. Further, three oil outflow holes 190 are formed in the end surface of the second sub-housing 20 facing toward the gas turbine engine 200. A hollow pin portion 193 of an oil distributor 192 is fitted into each of the oil outflow holes 190.

A first guide passage 1941 and a second guide passage 1942 are formed inside the oil distributor 192. The lubricating oil passing through the second auxiliary oil passages 188 is divided into the lubricating oil flowing through the first guide passage 1941 and the lubricating oil flowing through the second guide passage 1942. The outlet of the first guide passage 1941 is located at the second proximal end 862 of the second insertion hole 86. Accordingly, the lubricating oil flowing out of the first guide passage 1941 comes into contact with the second bearing 84 from the second proximal end 862.

The second guide passage 1942 branches off from a midstream location of the first guide passage 1941. A second oil supply hole 195 formed in the second bearing holder 88 is connected to an outlet of the second guide passage 1942. Therefore, the lubricating oil having passed through the second guide passage 1942 flows out from the second oil supply hole 195 and comes into contact with the second bearing 84.

As shown in FIG. 7, two drain ports 197 and two second drain passages 196 (other second discharge passages) are formed in the second sub-housing 20. As shown in FIG. 8, a space defined by the rectifying member 96 and the second outer stopper 92 communicates with the second drain passages 196 via the drain ports 197. Therefore, the lubricating oil entering into the space is discharged from the second drain passages 196 via the drain ports 197.

Figure 9:
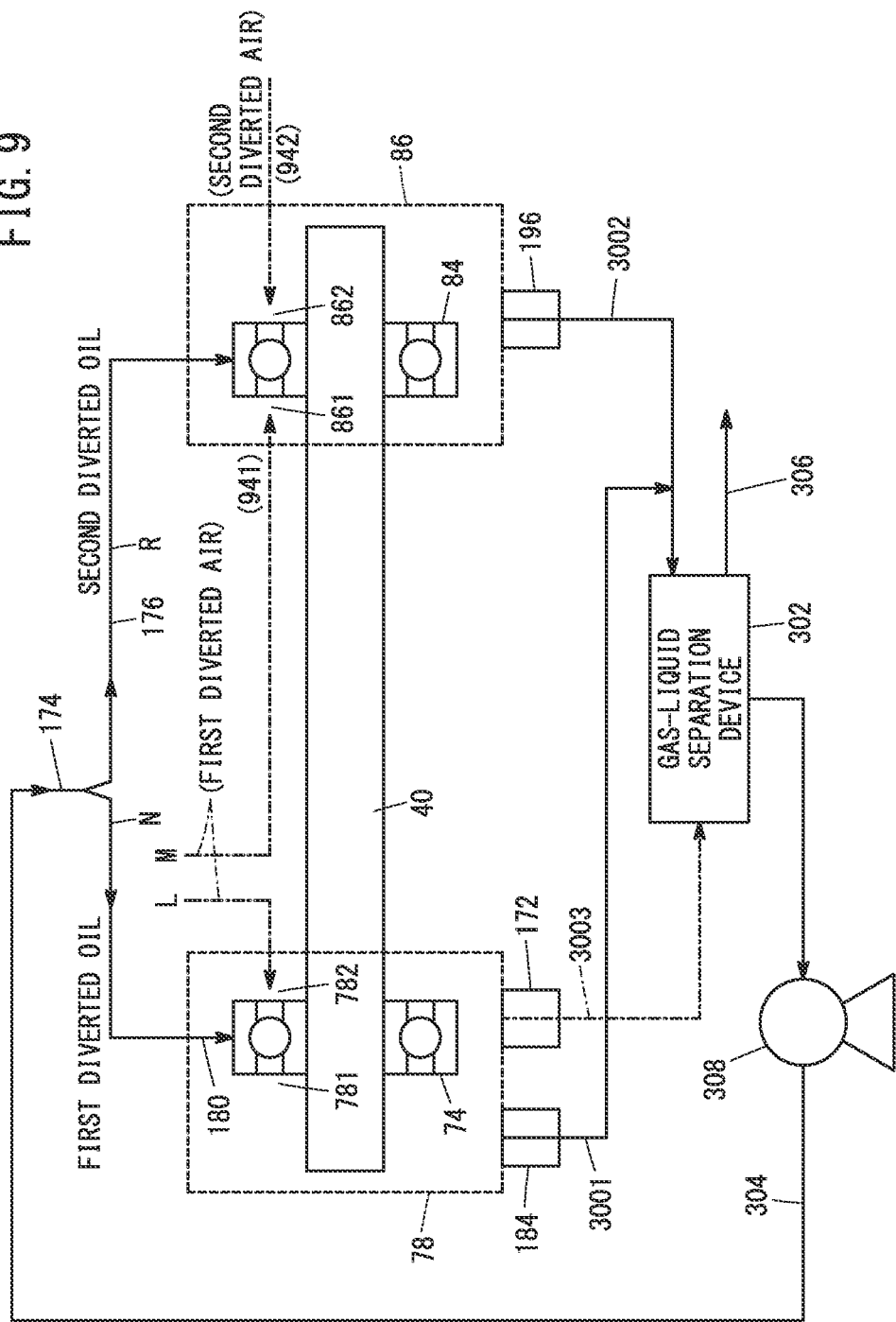
FIG. 9 is a schematic system diagram schematically showing a lubricating oil flow passage (second supply passage) in the rotary electric machine system.

As shown in FIG. 9, the first drain passage 184 is connected to a gas-liquid separation device 302 (one of the recovery devices and/or oil supply devices) via a first relay pipe 3001. The second drain passages 196 are connected to the gas-liquid separation device 302 via a second relay pipe 3002. The discharge passage 172 is connected to the gas-liquid separation device 302 via a third relay pipe 3003. That is, the compressed air and the lubricating oil supplied to the inside of the rotary electric machine housing 14 are recovered to the gas-liquid separation device 302. The gas-liquid separation device 302 is provided with a circulation supply line 304 (circulation passage) and a release line 306 (release passage). The circulation supply line 304 is provided with a circulation pump 308 which is one of the oil supply devices.

As will be described later, the lubricating oil flowing out from the first drain passage 184 and the second drain passages 196 contains compressed air. That is, the lubricating oil flowing into the gas-liquid separation device 302 is a gas-liquid mixture. In the gas-liquid separation device 302, the gas-liquid mixture is separated into lubricating oil and air. The lubricating oil is discharged from the gas-liquid separation device 302 by the circulation pump 308 and supplied to the input passage 174 again through the circulation supply line 304. Meanwhile, the air is released to the atmosphere through the release line 306.

Figure 10:
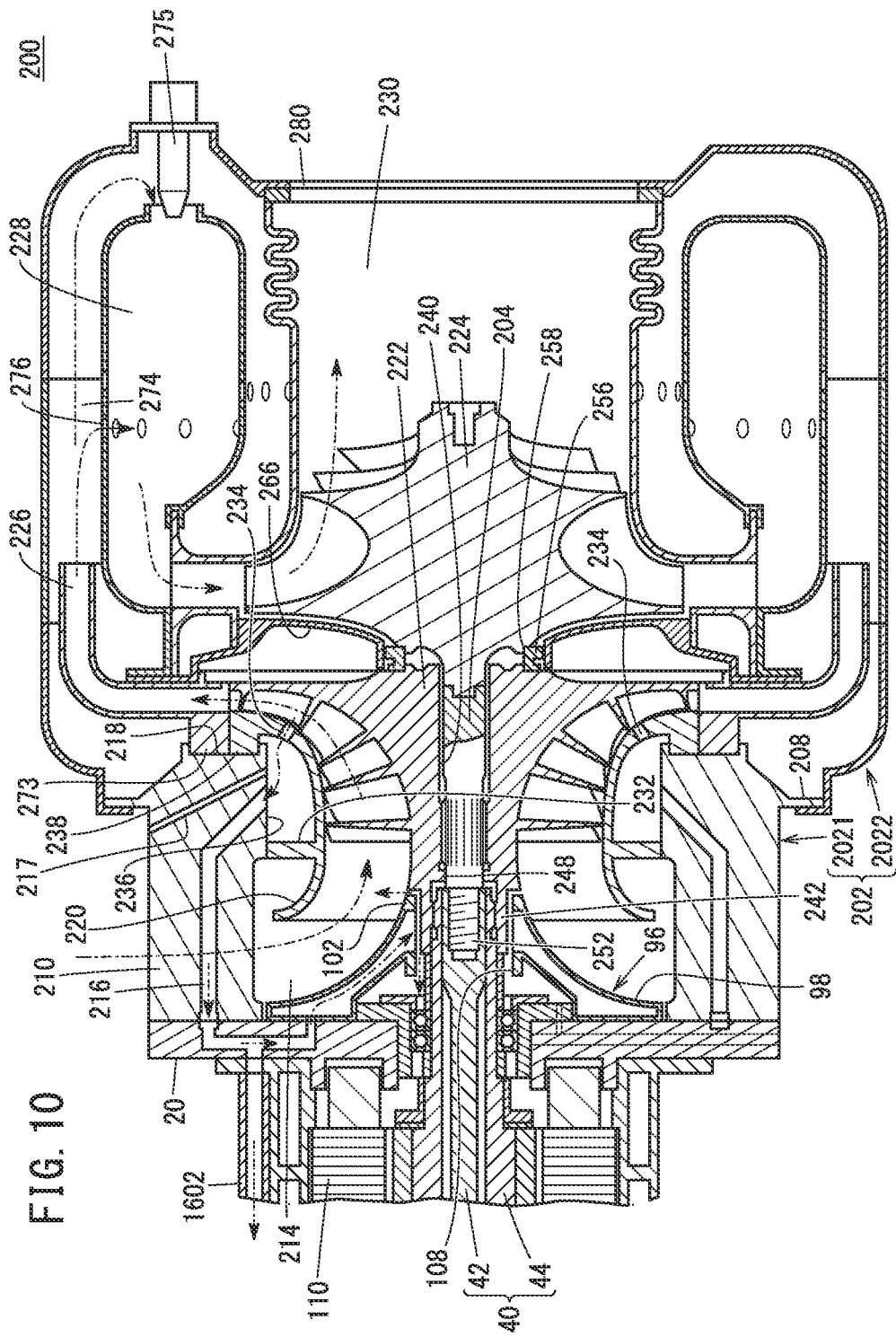
FIG. 10 is a schematic side cross-sectional view of a gas turbine engine comprising constituting part of the combined power system.

Next, the gas turbine engine 200 will be described. As shown in FIG. 10, the gas turbine engine 200 is equipped with an engine housing 202 and the output shaft 204 that rotates within the engine housing 202. The engine housing 202 includes an inner housing 2021 and an outer housing 2022. The inner housing 2021 is coupled to the second sub-housing 20 of the rotary electric machine system 10. The outer housing 2022 is coupled to the inner housing 2021. The outer housing 2022 is a housing body.

As shown in FIGS. 1 and 7, the inner housing 2021 includes a first annular portion 206, a second annular portion 208, and a plurality of leg members 210. The first annular portion 206 is coupled to the second sub-housing 20. The diameter of the second annular portion 208 is larger than the diameter of the first annular portion 206. The leg members 210 connect the first annular portion 206 and the second annular portion 208. In the illustrated example, the number of the leg members 210 is six. However, the number of the leg members 210 is determined in accordance with a coupling strength required between the gas turbine engine 200 and the rotary electric machine system 10. Stated otherwise, the number of the leg members 210 is not limited to six as in the illustrated example.

A cylindrical cover member 212 protrudes from a central opening of the second annular portion 208 toward the rotary electric machine system 10. Right ends of the leg members 210 are connected to the cylindrical cover member 212. An air intake space 214 is formed between and/or so as to be surrounded by the leg members 210.

As shown in FIGS. 7 and 10, air bleed passages 216 are individually formed inside the six leg members 210. Inlets of the air bleed passages 216 are individually formed at locations where the leg members 210 are connected with the cylindrical cover member 212. Outlets of the air bleed passages 216 are individually formed in an end surface of the first annular portion 206 facing toward the second sub-housing 20. All outlets of the air bleed passages 216 are located on the circumference of an imaginary circle. Therefore, all of the outlets of the air bleed passages 216 overlap with the collection flow path 162 formed in an annular shape. More specifically, all of the plurality of air bleed passages 216 are in communication with the collection flow path 162. In this manner, compressed air from the plurality of air bleed passages 216 flows into and is collected in the collection flow path 162.

An air vent hole 217 is formed in one of the leg members 210. The air vent hole 217 linearly extends from an inner wall to an outer wall of the cylindrical cover member 212. The air vent hole 217 may extend from the inner wall of the cylindrical cover member 212 to an outer wall of the leg member 210. The number of the air vent holes 217 may be one or more. Further, it is not essential to form the air vent hole 217.

As shown in FIG. 10, an annular engagement concave portion 218 is formed on a right end surface of the second annular portion 208. The shroud case 220 and a diffuser 226 are positioned and fixed by the engagement concave portion 218 (described later).

As shown in FIG. 10, the gas turbine engine 200 is further equipped with the shroud case 220, the compressor wheel 222, the turbine wheel 224, the diffuser 226, a combustor 228, and a nozzle 230.

The shroud case 220 is a hollow body and is larger than the rectifying member 96. A small diameter left end of the shroud case 220 faces toward the rectifying member 96. A large diameter right end of the shroud case 220 is inserted into the cylindrical cover member 212 of the inner housing 2021. Although the shroud case 220 is gradually reduced in diameter from the right end toward the left end thereof, a distal end of the left end is curved in a manner so as to expand outward in the diametrical direction.

A left end of the shroud case 220 is exposed to the air intake space 214. The top portion 102 of the rectifying member 96 enters into the inside of the left end of the shroud case 220. An annular closing flange portion 232 is provided on the curved side peripheral wall of the shroud case 220. The outer edge of the closing flange portion 232 abuts against the inner walls of the cylindrical cover member 212 and the leg members 210.

In the side wall of the shroud case 220, air bleed ports 234 are formed between the closing flange portion 232 and a first engagement convex portion 238. The air bleed ports 234 each extend from an inner surface to an outer surface of the side wall of the shroud case 220. The air bleed ports 234 are inlets where compressed air enters into a chamber 236.

The chamber 236 is interposed between the air bleed ports 234 and the air bleed passages 216. That is, the chamber 236 allows the air bleed ports 234 and the air bleed passages 216 to communicate with each other. The chamber 236 is open to the atmosphere via an air vent hole 217.

The first engagement convex portion 238 protrudes from a right end of the shroud case 220 toward the second annular portion 208. The first engagement convex portion 238 is engaged with the engagement concave portion 218 of the second annular portion 208. The shroud case 220 is positioned and fixed to the inner housing 2021 due to this engagement and contact of the outer edge of the closing flange portion 232 with the inner walls of the cylindrical cover member 212 and the leg members 210. At the same time, the chamber 236 is formed so as to be surrounded by the leg members 210, the cylindrical cover member 212, and the second annular portion 208, as well as by the closing flange portion 232, the side peripheral wall, and the first engagement convex portion 238 of the shroud case 220. The chamber 236 has an annular shape surrounding the shroud case 220.

The compressor wheel 222 and the turbine wheel 224 are capable of rotating together integrally with the rotating shaft 40 and the output shaft 204. More specifically, as shown in detail in FIG. 5, the compressor wheel 222 includes the small diameter cylindrical portion 242 at a left end thereof. The small diameter cylindrical portion 242 enters into the insertion hole 108 formed in the rectifying member 96. A first external spline 239 is formed on an inner wall of the small diameter cylindrical portion 242. The first external spline 239 meshes with the first inner spline 66 formed on the right opening end 442 of the outer shaft 44.

The right opening end 442 of the outer shaft 44 is press-fitted into a hollow interior part of the small diameter cylindrical portion 242. Therefore, the inner circumferential wall of the small diameter cylindrical portion 242 at the leftward opening, presses the outer peripheral wall of the right opening end 442 of the outer shaft 44 inwardly in the diametrical direction. The compressor wheel 222 is coupled to the outer shaft 44 (rotating shaft 40) due to the above-described meshing and press-fitting.

A through hole 240 extending along the left-right direction is formed at the center of the diameter of the compressor wheel 222. A second external spline 246 is formed on the inner wall of the left end of the through hole 240. Further, a hole diameter at a location where the through hole 240 is connected to the hollow interior part of the small diameter cylindrical portion 242 is slightly smaller in comparison with other locations thereof. Therefore, an inner flange portion 248 is provided in the vicinity of an opening of the through hole 240 on a small diameter cylindrical portion 242 side of the compressor wheel 222. The hole diameter (diameter) of the through hole 240 is minimal at the site where the inner flange portion 248 is provided.

The output shaft 204 provided on the turbine wheel 224 is inserted into the through hole 240. The left distal end of the output shaft 204 extends to substantially the same position as the left distal end of the small diameter cylindrical portion 242 of the compressor wheel 222. As noted previously, the outer circumferential wall of the right opening end 442 of the outer shaft 44 is inserted into the hollow interior part of the small diameter cylindrical portion 242. Therefore, the left end of the output shaft 204 protruding from the through hole 240 enters into the connecting hole 62 of the rotating shaft 40. A male threaded portion 252 is engraved on the left end of the output shaft 204. The male threaded portion 252 is screw-engaged with the female threaded portion 64 formed on the inner wall of the connecting hole 62. Due to such screw-engagement, the rotating shaft 40 and the output shaft 204 are connected.

A second internal spline 254 is formed in the vicinity of the left end of the output shaft 204. The second internal spline 254 meshes with the second external spline 246 formed on the inner circumferential wall of the through hole 240. Further, a left end part of the output shaft 204 is press-fitted into the inner flange portion 248.

In addition, as shown in FIG. 10, a ring member 256 is interposed between the compressor wheel 222 and the turbine wheel 224. The ring member 256 is made up from, for example, a heat-resistant metal material such as a nickel based alloy.

Figure 11:
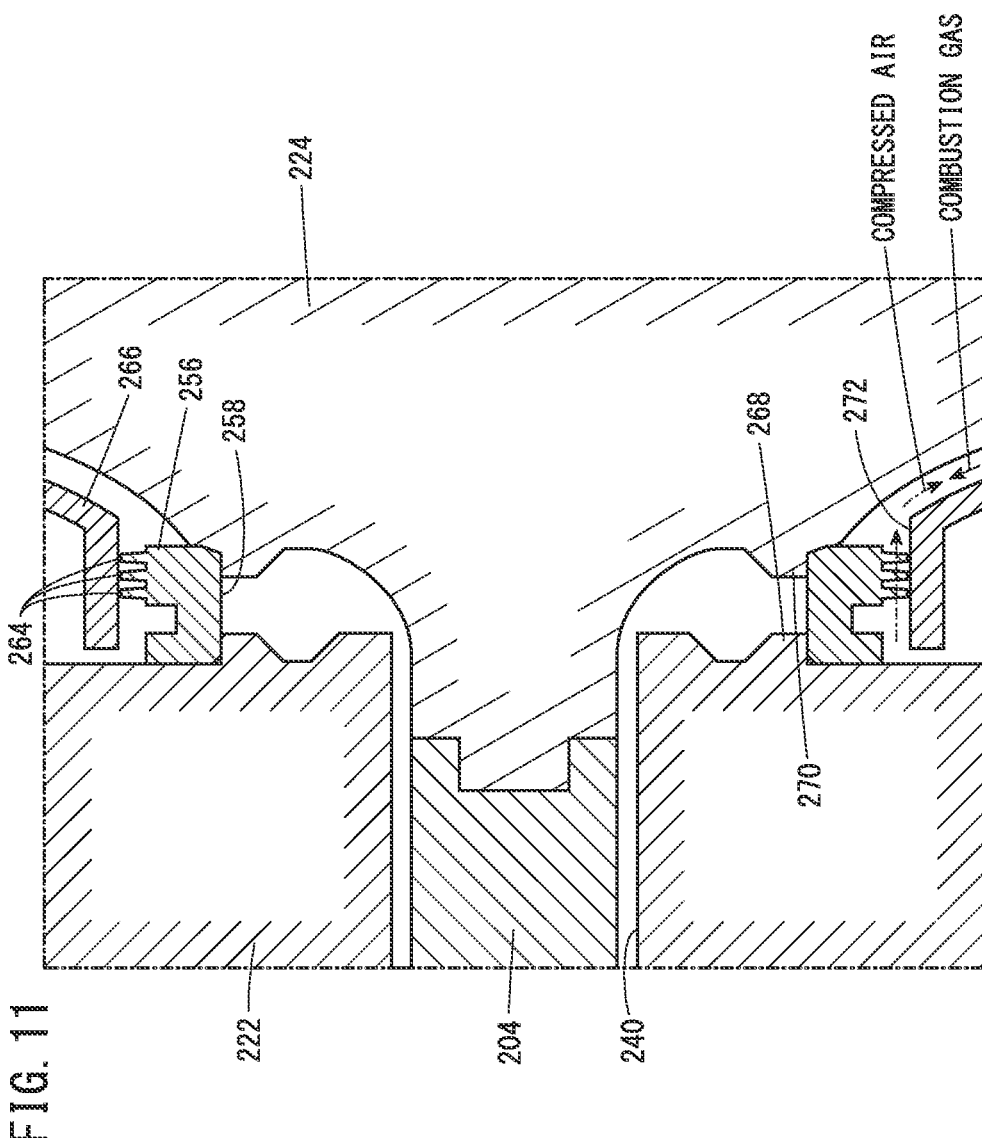
FIG. 11 is an enlarged view of principal components shown in FIG. 10.

As shown in FIG. 11, a fitting hole 258 which extends from the compressor wheel 222 toward the turbine wheel 224 is formed in the ring member 256. Further, the plurality of (for example, three) labyrinth forming convex portions 264 are formed on an outer circumferential wall of the ring member 256. The labyrinth forming convex portions 264 each project outwardly in a diametrical direction of the ring member 256 and extend along a circumferential direction of the outer circumferential wall thereof. As will be described later, back-flowing of a combusted fuel (exhaust gas) generated by the combustor 228 into the compressor wheel 222 is prevented by the labyrinth forming convex portions 264.

An annular protrusion 268 projects from a right end surface of the compressor wheel 222 that faces toward the turbine wheel 224. When a left end surface of the ring member 256 is seated on the right end surface of the compressor wheel 222, the annular protrusion 268 is fitted into the fitting hole 258. On the other hand, the output shaft 204 extends from a left end surface of the turbine wheel 224 that faces toward the compressor wheel 222. Further, on the left end surface, a fitting protrusion 270 that surrounds the output shaft 204 is formed to project from the turbine wheel 224. When a right end surface of the ring member 256 is seated on the left end surface of the turbine wheel 224, a top surface of the fitting protrusion 270 is fitted into the fitting hole 258. In accordance with the foregoing, each of respective parts of the compressor wheel 222 and the turbine wheel 224 are fitted into the fitting hole 258. In this state, the ring member 256 is sandwiched and held between the compressor wheel 222 and the turbine wheel 224.

In the hollow interior part of the outer housing 2022 (see FIG. 10), the labyrinth forming convex portions 264 are surrounded by an intermediate plate 266. The labyrinth forming convex portions 264 are inserted into a hole portion 272 formed in the intermediate plate 266. A labyrinth flow path is formed by an inner wall of the hole portion 272 and the labyrinth forming convex portions 264 that abut against the inner wall. The compressed air generated by the compressor wheel 222 reaches the labyrinth forming convex portions 264 via a back surface of the compressor wheel 222. On the other hand, a combustion gas arrives at the labyrinth forming convex portions 264 from the turbine wheel 224. Since the pressure of the compressed air is higher than the pressure of the combustion gas, it is possible to prevent the combustion gas from passing through the labyrinth forming convex portions 264 and flowing into the space surrounding the compressor wheel 222.

As shown in FIG. 10, in a hollow interior part of the outer housing 2022, portions of the shroud case 220 and the compressor wheel 222, and the intermediate plate 266 are surrounded by the diffuser 226. A second engagement convex portion 273 is formed at the left end of the diffuser 226. The second engagement convex portion 273 is engaged with the engagement concave portion 218 together with the first engagement convex portion 238 of the shroud case 220. The diffuser 226 is positioned and fixed to the inner housing 2021 due to this engagement.

In the hollow interior part of the outer housing 2022, the turbine wheel 224 is surrounded by the nozzle 230, and the nozzle 230 is surrounded by the combustor 228. An annular combustion air flow passage 274 is formed between the combustor 228 and the outer housing 2022. The combustion air flow passage 274 is a passage through which combustion air flows. A fuel supply nozzle 275 is positioned and fixed to a right end surface of the outer housing 2022. The fuel supply nozzle 275 supplies fuel to the combustor 228.

Relay holes 276 are formed in the combustor 228 for allowing the combustion air flow passage 274 to communicate with the interior of the combustor 228. As will be discussed later, the combustion air that is compressed by the compressor wheel 222 reaches the interior of the combustor 228, via the diffuser 226, the combustion air flow passage 274, and the relay holes 276. Non-illustrated fine holes are also formed in the combustor 228. The air discharged from the fine holes forms an air curtain to cool the interior of the combustor 228.

The nozzle 230 has a site surrounding the largest diameter portion of the turbine wheel 224. At this site, a non-illustrated delivery hole (not shown) is formed, which supplies to the turbine wheel 224 a fuel that is combusted, together with the combustion air. Hereinafter, the fuel that is combusted is also referred to as a "combusted fuel". The term "combusted fuel" has the same meaning as the "combustion gas" or the "exhaust gas after combustion".

A discharge port 280 opens on right ends of the outer housing 2022 and the nozzle 230. The combusted fuel passes through the delivery hole and progresses into the nozzle 230, and thereafter, the combusted fuel is expelled out of the outer housing 2022 via the discharge port 280 by the rotating turbine wheel 224. Although not particularly shown, the discharge port 280 is provided with a discharge pipe for discharging the combusted fuel.

The combined power system 400 according to the present embodiment is basically configured in the manner described above. Next, operations and effects of the combined power system 400 will be described.

First, a direct current is supplied from the battery 146. The conversion circuit 152 of the electrical current converter 150 shown in FIGS. 2 and 6 converts the direct current into an alternating current. The alternating current is supplied to the electromagnetic coil 110 (the U-phase coil, the V-phase coil, and the W-phase coil) via the U-phase terminal 1441, the V-phase terminal 1442, and the W-phase terminal 1443. By the alternating current flowing through the electromagnetic coil 110, an alternating magnetic field is generated in the stator 36. Therefore, attractive forces and repulsive forces act alternately between the electromagnetic coil 110 and the permanent magnets 72 of the rotor 34. As a result, the rotating shaft 40 begins to rotate. Alternatively, the rotating shaft 40 may also be rotated by a widely-known starter (not shown).

In this instance, as shown in FIG. 5, the first inner spline 66 is formed on the outer circumferential wall of the right opening end 442 of the outer shaft 44, and further, the first external spline 239 is formed on the inner wall of the small diameter cylindrical portion 242 of the compressor wheel 222. The first inner spline 66 and the first external spline 239 mesh with each other. Furthermore, the second internal spline 254 is formed on the output shaft 204, and the second external spline 246 is formed on the inner wall of the through hole 240 of the compressor wheel 222. The second internal spline 254 and the second external spline 246 mesh with each other. Therefore, a rotational torque of the rotating shaft 40 is rapidly transmitted to the output shaft 204 via the compressor wheel 222.

That is, when the rotating shaft 40 begins to rotate, the output shaft 204 also begins rotating integrally with the rotating shaft 40. Accompanying such rotation, the compressor wheel 222 and the turbine wheel 224, which are supported by the output shaft 204, rotate together integrally with the output shaft 204. As discussed previously, by causing the first inner spline 66 and the first external spline 239 to mesh with each other, and by causing the second internal spline 254 and the second external spline 246 to mesh with each other, the rotational torque of the rotating shaft 40 can be sufficiently transmitted to the output shaft 204.

Moreover, the right end part of the rotating shaft 40 is press-fitted into the hollow interior part of the small diameter cylindrical portion 242 of the compressor wheel 222. Also, the left end part of the output shaft 204 is press-fitted into the inner flange portion 248 of the compressor wheel 222. Therefore, the axis of the rotating shaft 40 and the axis of the output shaft 204 accurately coincide with each other. Consequently, the output shaft 204 is sufficiently prevented from rotating eccentrically or while being subjected to vibrations.

In addition, as shown in FIG. 11, the ring member 256 is interposed between the compressor wheel 222 and the turbine wheel 224. The annular protrusion 268 on the right end surface of the compressor wheel 222 and the fitting protrusion 270 on the left end surface of the turbine wheel 224 are fitted into the fitting hole 258 of the ring member 256. These fittings also contribute to suppressing eccentric rotation (and vibration) of the output shaft 204. Accordingly, there is no need to provide a mechanism for suppressing vibrations. Further, there is no need to make the output shaft 204 large in diameter. Consequently, it is possible to reduce the size and scale of the combined power system 400.

Further, a frictional force is generated between the right end surface of the compressor wheel 222 and the left end surface of the ring member 256. A frictional force is also generated between the right end surface of the ring member 256 and the left end surface of the turbine wheel 224. Owing to such frictional forces, the compressor wheel 222, the ring member 256, and the turbine wheel 224 are in close contact with each other. Accordingly, it is possible to avoid a situation in which both of the wheels 222 and 224 cause rotational misalignment with each other.

Further still, when the combined power system 400 is assembled, the compressor wheel 222 and the turbine wheel 224 are positioned or aligned (centered) by the above-described fittings with respect to the output shaft 204. In this manner, it is preferable to provide the ring member 256 between the wheels 222 and 224, and individually fit the portions of both the wheels 222 and 224 into the fitting hole 258 of the ring member 256. In accordance with this feature, it becomes easy to center the compressor wheel 222 and the turbine wheel 224 with respect to the output shaft 204.

Due to aforementioned rotation, as shown in FIG. 10, atmospheric air is drawn into the shroud case 220, via the air intake space 214 provided between and/or so as to be surrounded by the leg members 210 of the inner housing 2021. In this instance, the rectifying member 96 is located in the diametrical center of the inner housing 2021. As discussed previously, the rectifying member 96 is of a mountain-shape (chevron shape) in a manner so as to be reduced in diameter toward the shroud case 220. In addition, the surface of the reduced diameter portion 100 is smooth. Therefore, the atmospheric air that is drawn in is rectified by the rectifying member 96 so as to flow toward the shroud case 220. Since the right end of the rectifying member 96 enters from the left end opening of the shroud case 220, the atmospheric air efficiently enters into the shroud case 220. In this manner, due to the fact that the rectifying member 96 is formed in the shape as described above, and that the top portion 102 is made to enter into the shroud case 220, the atmospheric air can be efficiently collected in the shroud case 220.

The atmospheric air that is drawn into the shroud case 220 flows through between the compressor wheel 222 and the shroud case 220. Since the space between the compressor wheel 222 and the shroud case 220 is sufficiently narrow in comparison with the leftward opening of the shroud case 220, the atmospheric air is compressed when flowing therethrough. That is, compressed air is generated.

The air bleed ports 234 are formed in the shroud case 220. Therefore, portions of the compressed air are diverted from the air bleed ports 234 as the curtain air, and flow into the chamber 236. The chamber 236 has an annular shape, and also has a large volume compared with the volume of the air bleed ports 234. Therefore, the curtain air flowing into the chamber 236 is temporarily stored in the chamber 236.

Since the plurality of air bleed passages 216 are formed, compressed air is distributed from the chamber 236 to the respective air bleed passages 216. In this case, the pressures of the distributed portions of curtain air may be different from each other. However, in the present embodiment, the compressed air (curtain air) that has passed through the air bleed ports 234 flows into the single annular chamber 236. Accordingly, the pressure of the curtain air in the chamber 236 becomes constant. Stated otherwise, the pressure of the curtain air is made uniform. In this manner, the chamber 236 is a pressure adjustment chamber that adjusts the pressure of the curtain air to be substantially uniform.

The curtain air flowing in from the air bleed ports 234 includes portions of the compressed air as described above and has a high pressure. In this instance, since the volume of the chamber 236 is larger than the volume of the air bleed ports 234, the curtain air diffuses by flowing into the chamber 236. Therefore, the pressure of the curtain air decreases. As can be understood from such a feature, the chamber 236 also serves as a buffer chamber for reducing the pressure of the compressed air.

In addition to the air bleed passages 216, the air vent hole (or air vent holes) 217 is formed in the inner housing 2021. Excess compressed air is released to the outside (atmosphere) of the gas turbine engine 200 via the air vent hole 217. Therefore, an excessive increase in the pressure of the curtain air in the chamber 236 is avoided. That is, the pressure in the chamber 236 can be easily adjusted by the air vent hole 217.

In the chamber 236, inlets of the air bleed passages 216 formed individually in the respective six leg members 210 open. For this reason, the curtain air in the chamber 236 then individually flows through the six air bleed passages 216, and proceeds toward the second sub-housing 20. As described above, the pressure of the curtain air is substantially uniform at this point of time.

As shown in FIG. 7, all the outlets of the six air bleed passages 216 overlap with the collection flow path 162. Accordingly, the curtain air flowing through the six air bleed passages 216 flows into and is collected in the collection flow path 162, and is also diffused annularly along the collection flow path 162. In this process, the pressure of the curtain air is further made uniform.

Further, the curtain air flows into the three upstream communication holes 164 individually, from the collection flow path 162, and flows along the three air relay passages 166 individually. Thereafter, a portion of the curtain air is discharged from the first downstream communication holes 1681 to 1683. The remaining portion of the curtain air is discharged from the second downstream communication holes 1701 to 1703. Hereinafter, the curtain air discharged from the first downstream communication holes 1681 to 1683 is referred to as "first diverted air". The curtain air discharged from the second downstream communication holes 1701 to 1703 is referred to as "second diverted air".

The path of the first diverted air will be described. The first downstream communication hole 1681 communicates with the hollow interior part of the first hollow pipe member 1601. The first downstream communication hole 1682 communicates with the hollow interior part of the second hollow pipe member 1602. The first downstream communication hole 1683 communicates with the hollow interior part of the third hollow pipe member 1603. Therefore, the first diverted air flows through the hollow interior parts of the first hollow pipe member 1601 to the third hollow pipe member 1603 shown in FIG. 1 and the like, and flows from the second end toward the first end of the rotary electric machine housing 14.

The first hollow pipe member 1601 to the third hollow pipe member 1603 are located on the outer circumferential portion of the cooling jacket 24. A cooling medium is circulated in the cooling jacket 24 in advance. Therefore, in a process in which the first diverted air flows along the first hollow pipe member 1601 to the third hollow pipe member 1603, the heat of the first diverted air is sufficiently conducted to the cooling medium. As a result, the temperature of the first diverted air becomes comparatively low. That is, in the present embodiment, the temperature of the first diverted air can be lowered by the cooling jacket 24 for cooling the rotary electric machine 12, the electrical current converter 150, and the like. Therefore, in the gas turbine engine 200 or the rotary electric machine system 10, there is no need to separately provide cooling equipment in order to cool the curtain air. Therefore, it is possible to reduce the size and scale of the combined power system 400.

As shown in FIG. 2, the first diverted air flowing through the first hollow pipe member 1601 flows into the internal space of the second casing 28. Thus, an air curtain is formed in the second casing 28. An excess of the first diverted air flows into the hollow interior part (internal space) of the first casing 26 through the mutual communication hole. On the other hand, the first diverted air flowing through each of the second hollow pipe member 1602 and the third hollow pipe member 1603 flows into the internal space of the first casing 26. Therefore, in the first casing 26, an air curtain is formed by the first diverted air flowing through the first hollow pipe member 1601 to the third hollow pipe member 1603.

As shown in FIG. 3, an excess of the first diverted air in the first casing 26 flows into the accommodation chamber 22 formed in the main housing 16. As can be understood from such a configuration, the internal spaces of the first casing 26 and the second casing 28 are upstream in the flow path of the first diverted air. The accommodation chamber 22 of the main housing 16 is located downstream in the flow path of the first diverted air.

The first casing 26 and the second casing 28 are disposed at the first end (left end) of the main housing 16. Therefore, the first diverted air flows in from the left end of the accommodation chamber 22. The first diverted air then enters the clearance between the outer peripheral wall of the columnar protrusion 76 and the insulating base members 112. This clearance is an inner hole of the stator 36.

A portion of the first diverted air then flows toward the first insertion hole 78 via the first branch passage L. The remaining portion of the first diverted air flows through the second branch passage M toward the second insertion hole 86 along the clearance between the outer walls of the permanent magnets 72 and the inner wall of the electromagnetic coil 110. In this manner, the first diverted air branches into the compressed air that flows toward the first insertion hole 78 at the left end (the first end) and the compressed air that flows toward the second insertion hole 86 at the right end (the second end).

A portion of the first diverted air flowing toward the first insertion hole 78 reaches the first proximal end 782 of the first insertion hole 78. A portion of the first diverted air forms an air curtain for the first bearing 74 at the first proximal end 782. On the other hand, the remaining portion of the first diverted air flowing toward the second insertion hole 86 reaches the second distal end 861 of the second insertion hole 86 via the third sub-branch passage 941. The remaining portion of the first diverted air forms an air curtain for the second bearing 84 at the second distal end 861.

A path of the second diverted air will be described. The second downstream communication holes 1701 to 1703 individually overlap the three introduction ports 104 formed in the skirt portion 98 of the rectifying member 96. Accordingly, the second diverted air flows into the relay chamber 106 (the hollow interior part of the rectifying member 96) via the introduction ports 104.

As described above, the outlet of the relay chamber 106 opens at a position facing the small diameter cylindrical portion 242 of the compressor wheel 222. Therefore, the second diverted air flowing into the relay chamber 106 comes into contact with the small diameter cylindrical portion 242. A portion of the second diverted air then flows toward the fourth sub-branch passage 942. The remaining portion of the second diverted air flows toward the outlet passage 943.

A portion of the second diverted air reaches the second proximal end 862 of the second insertion hole 86 via the fourth sub-branch passage 942. The portion of the second diverted air forms an air curtain for the second bearing 84 at the second proximal end 862. As such, the second bearing 84 is sandwiched between the remaining portion of the second diverted air reaching the second proximal end 862 and the portion of the first diverted air reaching the second distal end 861.

The remaining portion of the second diverted air is discharged into the interior of the left end of the shroud case 220 via the outlet passage 943. At the left end opening of the shroud case 220, air intake is performed as described above. Thus, the remaining portion of the second diverted air is compressed by the compressor wheel 222 together with the drawn atmospheric air.

An excess of first diverted air reaches the discharge passage 172 through the accommodation chamber 22. An excess of the second diverted air flows from the second end to the first end of the main housing 16 via, for example, a clearance between an inner wall of the accommodation chamber 22 and the electromagnetic coil 110. Thereafter, the excess of the second diverted air reaches the discharge passage 172. The first diverted air and the second diverted air that have reached the discharge passage 172 are recovered by the gas-liquid separation device 302 (recovery device) via the third relay pipe 3003.

As described above, the pressure of the curtain air is made uniform by the chamber 236 provided between the inner housing 2021 and the shroud case 220. Therefore, the occurrence of a pressure distribution in the curtain air is avoided. Further, surging of the curtain air is also avoided. Therefore, it is possible to supply the curtain air to the circumference of each of the first bearing 74 and the second bearing 84 while maintaining a substantially uniform pressure of the curtain air.

As described above, the relay chamber 106 becomes wider as it is closer to the fourth sub-branch passage 942. In addition, the second diverted air flowing out of the relay chamber 106 is divided into a portion directed toward the fourth sub-branch passage 942 and the remaining portion directed toward the outlet passage 943. Accordingly, the pressure of the second diverted air reaching the second proximal end 862 is less than the pressure of the second diverted air prior to entering the relay chamber 106. As a result, the pressure of the first diverted air reaching the second distal end 861 and the pressure of the second diverted air reaching the second proximal end 862 are balanced.

Next, the path of the lubricating oil will be described. The lubricating oil is supplied to the first bearing 74 and the second bearing 84 as a lubricant.

The lubricating oil, which is recovered in the gas-liquid separation device 302 (oil recovery device) shown in FIG. 9 and is separated from the curtain air, is pushed out by the circulation pump 308. The lubricating oil is supplied to the input passage 174 formed in the main housing 16 through the circulation supply line 304. The lubricating oil flows from the input passage 174 into the main oil passage 176. The main oil passage 176 branches into a third branch passage N extending toward the first sub-housing 18 and a fourth branch passage R extending toward the second sub-housing 20. Therefore, the lubricating oil is divided into the lubricating oil flowing through the third branch passage N and the lubricating oil flowing through the fourth branch passage R. Hereinafter, the lubricating oil through the third branch passage N will be referred to as a "first diverted oil". The lubricating oil flowing through the fourth branch passage R will be referred to as a "second diverted oil".

The first diverted oil flows into the first auxiliary oil passages 180 via the first inflow holes 178 formed in the first sub-housing 18. The first diverted oil is then supplied to the first distal end 781 of the first insertion hole 78 via the first oil supply holes 182 formed in the first bearing holder 80. The first diverted oil further enters into the inner hole of the first bearing 74 to lubricate the first bearing 74.

The first diverted oil that has flowed from the first distal end 781 to the first proximal end 782 is obstructed by the first diverted air (air curtain) that has reached the first proximal end 782. Therefore, a situation is avoided in which the first diverted oil flows toward the first branch passage L. Therefore, entry of the first diverted oil into a space between the rotating shaft 40 and the electromagnetic coil 110 is also avoided. Accordingly, it is possible to avoid a situation in which the rotary electric machine 12 is contaminated with the first diverted oil.

The excess of the first diverted oil flows into the hollow recessed portion 118. The first drain passage 184 is provided in the hollow recessed portion 118. Therefore, the first diverted oil in the hollow recessed portion 118 is recovered in the gas-liquid separation device 302 via the first drain passage 184.

The second diverted oil flowing through the fourth branch passages R flows into the second auxiliary oil passages 188 via the oil receiving holes 186 formed in the second sub-housing 20. The second diverted oil flowing through the second auxiliary oil passages 188 is divided into a flow in the first guide passage 1941 and a flow in the second guide passage 1942 that are formed inside the oil distributor 192. A portion of the second diverted oil flowing out from the outlet of the first guide passage 1941 is supplied to the second proximal end 862 of the second insertion hole 86. The remaining portion of the second diverted oil that has passed through the second guide passage 1942 is supplied to the second bearing 84 via the second oil supply hole 195 formed in the second bearing holder 88. The second diverted oil enters into the inner hole of the second bearing 84 to lubricate the second bearing 84.

The second diverted oil entering into the inner hole of the second bearing 84 is surrounded by the first diverted air supplied to the second distal end 861 and the second diverted air supplied to the second proximal end 862. As described above, the pressure of the first diverted air supplied to the second distal end 861 and the pressure of the second diverted air supplied to the second proximal end 862 are balanced. Therefore, a situation is avoided in which the second diverted oil flows toward the third sub-branch passage 941 or the fourth sub-branch passage 942. Therefore, entry of the second diverted oil into a space between the rotating shaft 40 and the electromagnetic coil 110 is avoided. Further, entry of the second diverted oil into the relay chamber 106 of the rectifying member 96 is avoided. As a result, it is possible to avoid a situation in which the rotary electric machine 12 and the rectifying member 96 are contaminated with the second diverted oil.

As described above, the pressure of the curtain air is adjusted to be substantially uniform. Accordingly, an air curtain having a predetermined pressure is continuously formed around the first bearing 74 and the second bearing 84. Therefore, the lubricating oil is prevented from leaking out from the first bearing 74 and the second bearing 84.

The excess of the second diverted oil flows into a space defined by the rectifying member 96 and the second outer stopper 92. The drain ports 197 and the second drain passages 196 are formed in the second sub-housing 20. The second diverted oil that has flowed into the space is recovered in the gas-liquid separation device 302 via the drain ports 197 and the second drain passages 196.

As described above, the curtain air and the lubricating oil are recovered in the gas-liquid separation device 302. Here, since the lubricating oil is obstructed by the air curtain in the rotary electric machine housing 14, the lubricating oil is contained in the curtain air discharged from the discharge passage 172. That is, the curtain air discharged from the discharge passage 172 is substantially a gas-liquid mixture.

In the present embodiment, the recovery device also serves as the gas-liquid separation device 302. Therefore, the gas-liquid mixture is separated into air and lubricating oil. The air is released to the atmosphere through the release line 306 provided in the gas-liquid separation device 302. On the other hand, the lubricating oil is pushed out from the gas-liquid separation device 302 by the circulation pump 308. Further, the lubricating oil is supplied again from the gas-liquid separation device 302 to the first bearing 74 and the second bearing 84 via the circulation supply line 304. While the rotating shaft 40 is rotating, the first bearing 74 and the second bearing 84 are cooled by the lubricating oil.

In this manner, by separating the gas-liquid mixture into the lubricating oil and the air by the gas-liquid separation device 302, it is possible to avoid occurrence of so-called air entrainment in the circulation supply line 304 and the circulation pump 308. Therefore, the lubricating oil can be supplied again to the first bearing 74 and the second bearing 84 at an appropriate discharge pressure or flow rate. Therefore, the first bearing 74 and the second bearing 84 are sufficiently lubricated. As a result, seizure or galling can be prevented from occurring in the first bearing 74 and the second bearing 84.

In addition, an air curtain is formed in each of the second branch passage M, the third sub-branch passage 941, and the fourth sub-branch passage 942. The air curtains prevent the lubricating oil from entering into the internal spaces of the first casing 26 and the second casing 28. Therefore, adhering of the lubricating oil to the U-phase terminal 1441, the V-phase terminal 1442, the W-phase terminal 1443, the thermistor 148, and the like is suppressed. In other words, it is possible to avoid a situation in which electric terminal portions, measuring devices (thermistor 148), and the like are contaminated with the lubricating oil.

As described above, the curtain air (the first diverted air and the second diverted air) prevents the lubricating oil from scattering from the first bearing 74 and the second bearing 84. Thereafter, the curtain air is discharged to the outside of the rotary electric machine housing 14 as described above. Therefore, even if the lubricating oil ever leaks from the first bearing 74 or the second bearing 84, the lubricating oil that has leaked out is accompanied by the curtain air and is discharged to the exterior of the rotary electric machine housing 14. Therefore, it is possible to avoid a situation in which lubricating oil that has leaked out proceeds toward the rotor 34. It is also possible to avoid a situation in which lubricating oil that has leaked out remains inside the rotor 34.

The pressure of the curtain air continuously supplied to the rotary electric machine housing 14 is substantially uniform as described above. Therefore, it is possible to continuously prevent the above-described scattering of the lubricating oil. Even if the lubricating oil leaks, the lubricating oil that has leaked out can be continuously discharged to the exterior of the rotary electric machine housing 14.

The compressed air that has passed between the shroud case 220 and the compressor wheel 222 without entering into the air bleed ports 234 becomes combustion air. As shown in FIG. 10, the combustion air flows into the diffuser 226. The combustion air flows out from an outlet hole formed in a wall portion of the diffuser 226, and into the combustion air flow passage 274 formed between the combustor 228 and the outer housing 2022. The combustion air further flows into the combustion chamber (the hollow interior part of the combustor 228) via the relay holes 276 and the fine holes formed in the combustor 228, and via the clearance between the combustor 228 and the fuel supply nozzle 275, and the like.

The combustor 228 is in a reheated state. Therefore, the temperature of the combustion chamber is also high. The fuel is supplied from the fuel supply nozzle 275 into the high temperature combustion chamber. The fuel is combusted together with the combustion air and becomes a high temperature combusted fuel. When the combusted fuel is supplied from the delivery hole into the nozzle 230, it expands in the nozzle 230. This causes the turbine wheel 224 to begin to rotate at a high speed.

The output shaft 204 supports the turbine wheel 224. The output shaft 204 is provided with the compressor wheel 222. Therefore, as the turbine wheel 224 rotates at a high speed, the output shaft 204 and the compressor wheel 222 rotate integrally at the high speed. At the same time, the rotating shaft 40 also rotates at the high speed. Moreover, the combusted fuel is discharged to the exterior of the outer housing 2022 through a non-illustrated discharge pipe provided in the discharge port 280.

The ring member 256 is interposed between the compressor wheel 222 and the turbine wheel 224, and also fulfills a role as a sealing member for sealing a space between both of the wheels 222 and 224. Further, as shown in FIG. 11, the plurality of labyrinth forming convex portions 264 are formed on the outer circumferential wall of the ring member 256. The labyrinth forming convex portions 264 are in contact with the inner wall of the hole portion 272 formed in the intermediate plate 266. The compressed air generated by the compressor wheel 222 reaches the labyrinth forming convex portions 264 via the back surface of the compressor wheel 222. Further, a combustion gas arrives at the labyrinth forming convex portions 264 from the turbine wheel 224. As noted above, the pressure of the compressed air is higher than the pressure of the combustion gas. Therefore, passing of the combustion gas through the labyrinth forming convex portions 264 and flowing into the compressor wheel 222 is suppressed. Due to the above reasons, a situation is avoided in which the combusted fuel, for example, enters into the through hole 240 from between both of the wheels 222 and 224.

As shown in FIG. 10, when the output shaft 204 begins to rotate at a high speed, supplying of the electrical current from the battery 146 (see FIG. 6) to the electromagnetic coil 110 is stopped. However, since the turbine wheel 224 is rotated at a high speed as described above, the rotating shaft 40 rotates at the high speed integrally with the turbine wheel 224 and the output shaft 204. At this time as well, for the same reason as described above, a sufficient rotational torque is transmitted from the output shaft 204 to the rotating shaft 40.

In FIG. 3, the direction in which the output shaft 204 and the rotating shaft 40 are rotated is preferably a direction that is opposite to the direction in which the small cap nut 58, the large cap nut 60, and the male threaded portion 252 are rotated when screw-engagement thereof is carried out. This is because, in this case, a situation is avoided in which the small cap nut 58, the large cap nut 60, and the male threaded portion 252 become loosened during rotation of the rotating shaft 40. Moreover, the small cap nut 58, the large cap nut 60, and the male threaded portion 252 may be provided in advance with a mechanism for preventing loosening thereof.

Since the rotating shaft 40 retains the permanent magnets 72, an alternating current is generated in the electromagnetic coil 110 surrounding the permanent magnets 72. The alternating current is transmitted to the electrical current converter 150 shown in FIGS. 2 and 6 via the U-phase terminal 1441, the V-phase terminal 1442, and the W-phase terminal 1443. The conversion circuit 152 of the electrical current converter 150 converts such an alternating current into a direct current. When it is determined that the output of an external load (for example, a motor) that is electrically connected to the battery 146 has decreased, the control circuit 156 of the electrical current converter 150 transfers the direct current to the battery 146 through the capacitor 154 (see FIG. 6). Consequently, the battery 146 is charged.

In this process, within the electrical current converter 150, in particular, the conversion circuit 152 and the capacitor 154 become heated. In the present embodiment, however, in the equipment case 158, the conversion circuit 152 and the capacitor 154 are in close proximity to the cooling jacket 24. Therefore, the heat of the conversion circuit 152 and the capacitor 154 is rapidly conducted to the cooling medium inside the cooling jacket 24. Consequently, a situation is avoided in which the conversion circuit 152 and the capacitor 154 become excessively high in heat.

The electromagnetic coil 110 generates heat as the electrical current flows therethrough. In this instance, the left end of the stator 36 is in contact with a portion of the first diverted air. Further, the remaining portion of the first diverted air, which passes through the accommodation chamber 22 toward the second insertion hole 86, comes into contact with the outer wall and the inner wall of the stator 36. Therefore, the stator 36 is cooled by the first diverted air. In addition, the cooling medium flows through the cooling jacket 24 provided in the main housing 16. The rotary electric machine 12 is rapidly cooled by the cooling medium.

In the present embodiment, the rotary electric machine housing 14 (the main housing 16) in which the rotary electric machine 12 is accommodated, and the first casing 26 in which the U-phase terminal 1441, the V-phase terminal 1442, and the W-phase terminal 1443 are accommodated are separately provided. Therefore, it is unlikely for the influence of heat that is generated in the stator 36 inside the main housing 16 to be imparted to the U-phase terminal 1441, the V-phase terminal 1442, and the W-phase terminal 1443 in the first casing 26. The U-phase terminal 1441, the V-phase terminal 1442, and the W-phase terminal 1443 also generate heat with energization. However, the U-phase terminal 1441, the V-phase terminal 1442, and the W-phase terminal 1443 are rapidly cooled by the first diverted air supplied to the first casing 26.

In the foregoing manner, the first diverted air also serves in a dual manner to cool the heat generating locations in the rotary electric machine system 10. From the fact that the electric terminal portions (the U-phase terminal 1441, the V-phase terminal 1442, and the W-phase terminal 1443), the electromagnetic coil 110, the permanent magnets 72 and the like are cooled, it is possible to avoid the influence of heat on an output control or the like of the rotary electric machine system 10. In addition, it is possible to avoid a situation and the like in which excitation of the electromagnetic coil 110 and the permanent magnets 72 decreases due to heat. As a result, the reliability of the rotary electric machine system 10 is improved.

Further, from the fact that the main housing 16 in which the rotary electric machine 12 is accommodated, and the first casing 26 in which the U-phase terminal 1441, the V-phase terminal 1442, and the W-phase terminal 1443 are accommodated are separately provided, the rotary electric machine 12 and the electric terminal portions are separated away from each other. Therefore, the U-phase terminal 1441, the V-phase terminal 1442, and the W-phase terminal 1443 are not easily affected by vibrations generated accompanying rotation of the rotor 34. Stated otherwise, the U-phase terminal 1441, the V-phase terminal 1442, and the W-phase terminal 1443 are protected from such vibrations. Further, as discussed previously, in the first bearing 74 and the second bearing 84, the occurrence of seizure is suppressed by the lubricating oil. Accordingly, the rotary electric machine system 10 is superior in terms of durability.

While the rotating shaft 40 is rotating, the angle of rotation (a rotation parameter) of the rotating shaft 40 is detected by the resolver 132. More specifically, the resolver rotor 56 which is externally fitted on the left end part 422 of the inner shaft 42 rotates together integrally with the rotating shaft 40. Consequently, electric signals generated in the resolver stator 130 are transmitted to the receiver via the transmission connector 136. The receiver that has read the electric signals calculates the angle of rotation of the rotating shaft 40 based on the electric signal. The receiver transmits the calculation result to a not illustrated control device or the like. The control device or the like obtains the RPM by way of a calculation based on the angle of rotation.

The resolver 132 is disposed on the protruding distal end 46 of the rotating shaft 40 that is exposed from the rotary electric machine housing 14. Accordingly, it is unlikely for the influence of heat generated in the electromagnetic coil 110 of the stator 36 inside the rotary electric machine housing 14 to be imparted to the resolver 132. Also, it is unlikely for the influence of vibrations generated accompanying rotation of the rotor 34 to be imparted to the resolver 132. In addition, the first bearing 74 and the second bearing 84 that support the rotating shaft 40 are provided inside the rotary electric machine housing 14. Therefore, vibrations of the first bearing 74 and the second bearing 84 are suppressed by the rotary electric machine housing 14. This feature as well also makes it unlikely for the influence of vibrations to reach the resolver 132.

In the foregoing manner, in the present embodiment, the transfer of heat and vibrations to the resolver 132 is suppressed. Thus, the detection result of the rotation angle by the resolver 132 becomes accurate. Further, the useful lifetime of the resolver 132 is also lengthened.

The resolver 132 may be replaced with another resolver having larger inner and outer diameters. In the case that a single solid rotating shaft is adopted as the rotating shaft, and that the resolver is replaced with one having a large inner diameter and outer diameter, it is necessary to replace the rotating shaft with a large-diameter solid rotating shaft. At this time, it is difficult for such a solid rotating shaft with a large diameter to pass through the first bearing 74 or the second bearing 84.

In the present embodiment, the outer shaft 44 and the inner shaft 42 constitute the rotating shaft 40. Further, the outer shaft 44 is passed through the first bearing 74 and the second bearing 84, and the resolver rotor 56 is disposed on the portion of the inner shaft 42 that is exposed from the outer shaft 44. Therefore, in the case where the resolver 132 is replaced with another resolver having larger inner and outer diameters, the inner shaft 42 can be replaced with another inner shaft having the left end part 422 with a larger diameter. As can be understood from this situation, according to the present embodiment, by replacing the inner shaft 42, it becomes possible to cope with resolvers having various inner diameters and outer diameters.

As described above, the present embodiment discloses the combined power system (400) that includes the rotary electric machine system (10) and the internal combustion engine (200). The rotary electric machine system includes the rotary electric machine (12) and the rotary electric machine housing (14) configured to rotatably support the rotating shaft (40) of the rotary electric machine, the internal combustion engine including the output shaft (204) configured to rotate integrally with the rotating shaft. The combined power system includes the compressor wheel (222) provided for the output shaft and configured to obtain compressed air by compressing outside air, the shroud case (220) surrounding the compressor wheel, the turbine wheel (224) provided for the output shaft, the diffuser (226) configured to diffuse the compressed air that has passed between the compressor wheel and the shroud case, and the engine housing (202) surrounding the shroud case, the diffuser, and the compressor wheel, wherein the air bleed port (234) is formed in the shroud case in order to extract the compressed air to outside of the shroud case, the plurality of air bleed passages (216) are formed in the rotary electric machine housing, and the compressed air extracted from the air bleed port flows through the air bleed passages, and the annular chamber (236) is formed between the air bleed port and the plurality of air bleed passages, and is configured to store the compressed air.

Since the plurality of air bleed passages are formed, compressed air is distributed to the respective air bleed passages. In this case, the pressures of the distributed portions of compressed air may be different from each other. However, in the present configuration, portions of the compressed air that have individually passed through the air bleed port flow into the single annular chamber. Accordingly, the pressure of the compressed air in the chamber becomes constant. Stated otherwise, the pressure of the compressed air is made uniform.

Further, when the compressed air that has passed through the air bleed port flows into the chamber, the compressed air diffuses in the chamber. Due to this diffusion, the pressure of the compressed air decreases.

Therefore, the occurrence of a pressure distribution in the compressed air is avoided. Further, surging of the compressed air is also avoided. Therefore, it is possible to maintain a substantially uniform pressure of compressed air. For example, such compressed air can be used as curtain air that surrounds the bearing in the rotary electric machine housing.

The present embodiment discloses the combined power system in which the engine housing includes the housing body (2022) and the plurality of leg members (210) interposed between the housing body and the rotary electric machine housing, the housing body being configured to accommodate the shroud case, the diffuser, and the compressor wheel, the air intake space (214) is formed so as to be surrounded by the plurality of leg members, and a part of the shroud case is exposed to the air intake space, and each of the plurality of air bleed passages is formed individually in each of the plurality of leg members.

By providing the plurality of leg members in the engine housing in this way, a space provided between and/or so as to be surrounded by the leg members can be utilized as the air intake space. Further, by forming the air bleed passage inside the plurality of leg members, bleed air (compressed air) can be easily sent to the rotary electric machine housing. This is because the leg members are interposed between the engine housing and the rotary electric machine housing. Additionally, in this case, there is no need to form the air bleed passages in other members.

The present embodiment discloses the combined power system in which the compressed air flow path is formed in the rotary electric machine housing, and the compressed air that has passed through the plurality of air bleed passages flows through the compressed air flow path, and the relay communication passage (1601 to 1603) is formed outside the rotary electric machine housing, and is configured to place the plurality of air bleed passages in communication with the compressed air flow path.

In this way, the compressed air that has passed through the air bleed passage flows inside the rotary electric machine housing via the compressed air flow path. For example, the rotary electric machine can be efficiently cooled by the compressed air such that the compressed air is brought into contact with the rotary electric machine accommodated in the rotary electric machine housing.

Further, if both the compressed air flow path and the relay communication passage are disposed inside or outside the rotary electric machine housing, it is necessary to avoid the crossing of the compressed air flow path and the relay communication passage. Therefore, installation places for the compressed air flow path and the relay communication passage are limited. In contrast, in the present embodiment, since the relay communication passage is formed outside the rotary electric machine housing, there is no crossing of the compressed air flow path and the relay communication passage. Accordingly, such configuration enhances the freedom in design of installation places for the compressed air flow path and the relay communication passage.

The present embodiment discloses the combined power system in which the collection flow path (162) is formed in the rotary electric machine housing, and is configured to relay the plurality of air bleed passages and the relay communication passage, and the compressed air that has flowed through the plurality of air bleed passages is merged in the collection flow path.

In this manner, portions of the compressed air that have individually passed through the plurality of air bleed passages merge in the collection flow path. Therefore, in a similar manner to the case when the compressed air that has passed through the air bleed ports merges in the chamber, pressures of the portions of the compressed air that have individually passed through the plurality of air bleed passages can be made substantially uniform in the collection flow path. Therefore, the pressure of the compressed air supplied to the rotary electric machine housing can be made substantially uniform more easily.

The present embodiment discloses the combined power system in which the relay communication passage comprises the plurality of relay communication passages, and the collection flow path distributes the compressed air merged in the collection flow path into the plurality of relay communication passages.

In this manner, due to the plurality of the relay communication passages, the compressed air can be distributed to a plurality of supply destinations.

The present embodiment discloses the combined power system further including the first bearing (74) and the second bearing (84) that are interposed between the rotary electric machine housing and the rotating shaft, wherein the compressed air that has passed through the compressed air flow path is supplied to the first bearing and the second bearing.

A lubricating oil is supplied to the bearings. In this configuration, for example, compressed air is used as curtain air to prevent the lubricating oil from leaking out from the bearings. Therefore, it is not necessary to provide a sealing member such as an O-ring. Therefore, the number of parts can be reduced.

The present invention is not limited to the above disclosure, and various modifications are possible without departing from the essence and gist of the present invention.

For example, in this embodiment, the third sub-branch passage 941 and the fourth sub-branch passage 942 are provided. Alternatively, the first branch passage L may be branched into a first sub-branch passage and a second sub-branch passage. In this case, a portion of the first diverted air is supplied from the first sub-branch passage to the first distal end 781, and a portion of the first diverted air is supplied from the second sub-branch passage to the first proximal end 782. Alternatively, the first branch passage L may be branched into the first sub-branch passage and the second sub-branch passage, and the third sub-branch passage 941 and the fourth sub-branch passage 942 may be provided.

In the gas turbine engine 200, the compressor wheel 222 and the turbine wheel 224 may be arranged in a reverse direction to that shown in FIG. 10. In this case, the through hole 240 may be formed in the turbine wheel 224, and the output shaft 204 may be provided in the compressor wheel 222. Alternatively, the compressor wheel 222 and the turbine wheel 224 may be of a centrifugal type or an axial flow type. If the compressor wheel 222 and the turbine wheel 224 are arranged coaxially, a combination of a multi-stage compressor wheel and a multi-stage turbine wheel may be used in which the centrifugal type and the axial flow type are combined.

As shown in FIG. 3, the rotary electric machine 12 constituting the rotary electric machine system 10 may be a motor in which the rotating shaft 40 is rotated by supplying electrical current to the electromagnetic coil 110. In this case, the U-phase terminal 1441, the V-phase terminal 1442, and the W-phase terminal 1443 are electric terminal portions that receive electric power from the battery 146.

Figure 12:
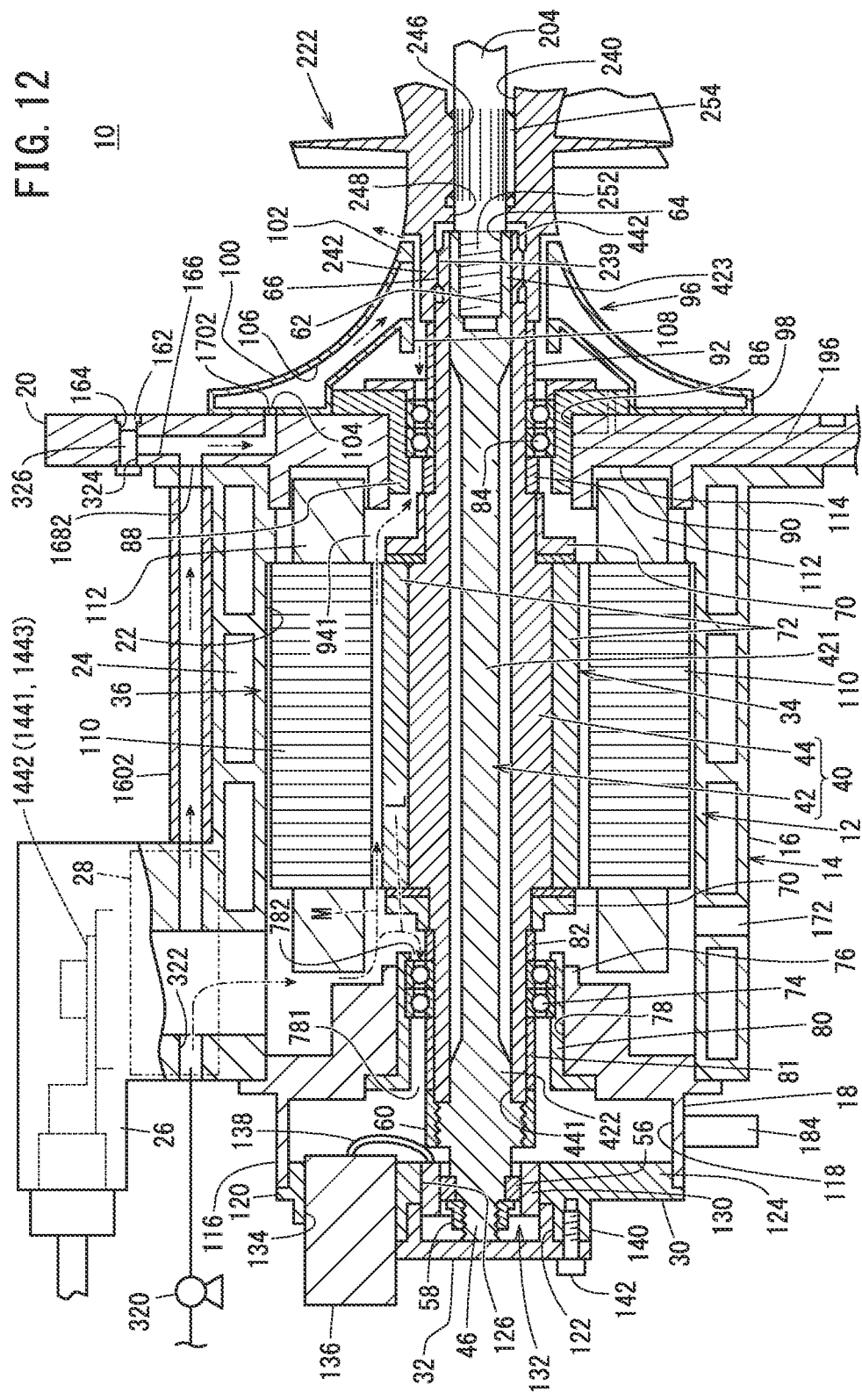
FIG. 12 is a schematic side sectional view in the case where an externally provided compression pump is used as a gas supply source.

In the above-described embodiment, an embodiment is illustrated in which a part of the compressed air generated in the gas turbine engine 200 is supplied to the rotary electric machine housing 14. Alternatively, as shown in FIG. 12, an externally provided compression pump 320 or the like may be used as a gas supply source.

In this case, for example, a communication hole 322 is formed in the first casing 26. Compressed air sent from the compression pump 320 flows into the communication hole 322. Further, communication holes 324 communicating with the upstream communication holes 164 are formed in the second sub-housing 20. The communication holes 324 are closed by plugs 326. In this state, the compression pump 320 compresses the atmosphere or the like to obtain compressed air. The compressed air is supplied to the first hollow pipe member 1601 to the third hollow pipe member 1603.

In this case, the entire amount of compressed air can be used as combustion air.

What is claimed is:

1. A combined power system that includes a rotary electric machine system and an internal combustion engine, the rotary electric machine system including a rotary electric machine and a rotary electric machine housing configured to rotatably support a rotating shaft of the rotary electric machine, the internal combustion engine including an output shaft configured to rotate integrally with the rotating shaft, the combined power system comprising:
   a compressor wheel provided for the output shaft and configured to obtain compressed air by compressing outside air;
   a shroud case surrounding the compressor wheel;
   a turbine wheel provided for the output shaft;
   a diffuser configured to diffuse the compressed air that has passed between the compressor wheel and the shroud case; and
   an engine housing surrounding the shroud case, the diffuser, and the compressor wheel,
   wherein an air bleed port is formed in the shroud case in order to extract the compressed air to outside of the shroud case,
   a plurality of air bleed passages are formed in the engine housing, and the compressed air extracted from the air bleed port flows through the air bleed passages,
   an annular chamber is formed between the air bleed port and the plurality of air bleed passages, and is configured to store the compressed air, the engine housing includes a housing body and a plurality of leg members interposed between the housing body and the rotary electric machine housing, the housing body being configured to accommodate the shroud case, the diffuser, and the compressor wheel,
   an air intake space is formed so as to be surrounded by the plurality of leg members, and a part of the shroud case is exposed to the air intake space, and
   each of the plurality of air bleed passages is formed individually in each of the plurality of leg members.

2. A combined power system that includes a rotary electric machine system and an internal combustion engine, the rotary electric machine system including a rotary electric machine and a rotary electric machine housing configured to rotatably support a rotating shaft of the rotary electric machine, the internal combustion engine including an output shaft configured to rotate integrally with the rotating shaft, the combined power system comprising:
   a compressor wheel provided for the output shaft and configured to obtain compressed air by compressing outside air;
   a shroud case surrounding the compressor wheel;
   a turbine wheel provided for the output shaft;
   a diffuser configured to diffuse the compressed air that has passed between the compressor wheel and the shroud case; and
   an engine housing surrounding the shroud case, the diffuser, and the compressor wheel,
   wherein an air bleed port is formed in the shroud case in order to extract the compressed air to outside of the shroud case,
   a plurality of air bleed passages are formed in the engine housing, and the compressed air extracted from the air bleed port flows through the air bleed passages,
   an annular chamber is formed between the air bleed port and the plurality of air bleed passages, and is configured to store the compressed air,
   a compressed air flow path is formed in the rotary electric machine housing, and the compressed air that has passed through the plurality of air bleed passages flows through the compressed air flow path, and
   a relay communication passage is formed outside the rotary electric machine housing, and is configured to place the plurality of air bleed passages in communication with the compressed air flow path.

3. The combined power system according to claim 2, wherein a collection flow path is formed in the rotary electric machine housing, and is configured to relay the plurality of air bleed passages and the relay communication passage, and
   the compressed air that has flowed through the plurality of air bleed passages is merged in the collection flow path.

4. The combined power system according to claim 3, wherein the relay communication passage comprises a plurality of relay communication passages, and the collection flow path distributes the compressed air merged in the collection flow path into the plurality of relay communication passages.

5. The combined power system according to claim 2, further comprising a first bearing and a second bearing that are interposed between the rotary electric machine housing and the rotating shaft,
   wherein the compressed air that has passed through the compressed air flow path is supplied to the first bearing and the second bearing.

* * * * *